US012806575B2

(12) United States Patent
Jassby et al.

(10) Patent No.: US 12,806,575 B2
(45) Date of Patent: Nov. 24, 2026

(54) PREVENTION OF MINERAL SCALE ON ELECTRICALLY CONDUCTING MEMBRANES

(71) Applicant: The Regents of the University of California, Oakland, CA (US)

(72) Inventors: David Jassby, Los Angeles, CA (US); Unnati Rao, Los Angeles, CA (US); Eric Hoek, Los Angeles, CA (US); Bongyeon Jung, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 482 days.

(21) Appl. No.: 18/266,516

(22) PCT Filed: Dec. 1, 2021

(86) PCT No.: PCT/US2021/061426
§ 371 (c)(1),
(2) Date: Jun. 9, 2023

(87) PCT Pub. No.: WO2022/125356
PCT Pub. Date: Jun. 16, 2022

(65) Prior Publication Data
US 2024/0109039 A1 Apr. 4, 2024

Related U.S. Application Data

(60) Provisional application No. 63/123,133, filed on Dec. 9, 2020.

(51) Int. Cl.
*B01D 65/08* (2006.01)
*B01D 67/00* (2006.01)
*B01D 69/02* (2006.01)
*B01D 69/14* (2006.01)
*B01D 71/02* (2006.01)
(Continued)

(52) U.S. Cl.
CPC ......... *B01D 65/08* (2013.01); *B01D 67/0079* (2013.01); *B01D 69/02* (2013.01); *B01D 69/148* (2013.01); *B01D 71/0212* (2022.08); *B01D 71/381* (2022.08); *C02F 1/441* (2013.01); *B01D 2321/22* (2013.01); *B01D 2323/30* (2013.01);
(Continued)

(58) Field of Classification Search
None
See application file for complete search history.

(56) References Cited

U.S. PATENT DOCUMENTS

2018/0237301 A1 8/2018 Dosoretz et al.
2019/0009217 A1 1/2019 Jassby et al.

FOREIGN PATENT DOCUMENTS

WO WO-2020/051403 A1 3/2020

OTHER PUBLICATIONS

Supplementary European Search Report on European Application No. 21904138 dated Oct. 1, 2024, 8 pages.
(Continued)

*Primary Examiner* — Krishnan S Menon
(74) *Attorney, Agent, or Firm* — Foley & Lardner LLP

(57) ABSTRACT

A membrane desalination system includes a housing, an electrically conductive membrane disposed within the housing, wherein the electrically conductive membrane includes a porous support and an electrically conductive layer disposed on the porous support, and the electrically conductive layer includes nanostructures, and an alternating current power source connected to the electrically conductive membrane.

13 Claims, 15 Drawing Sheets

(51) Int. Cl.
*B01D 71/38* (2006.01)
*C02F 1/44* (2023.01)
*C02F 103/06* (2006.01)

(52) U.S. Cl.
CPC ...... *B01D 2325/26* (2013.01); *C02F 2103/06* (2013.01); *C02F 2303/22* (2013.01)

(56) References Cited

OTHER PUBLICATIONS

Examination Report on Saudi Arabia Application No. 523441221 date Mar. 5, 2025 (7 pages).

Notice of Reasons for Refusal on Japanese Application No. 2023-535000 dated Sep. 1, 2025 (5 pages with English language translation).

Office Action on Israeli Application No. 303560 dated Sep. 15, 2025 (3 pages).

A.J. Karabelas, et al., "Scaling in reverse osmosis desalination plants: A perspective focusing on development of comprehensive simulation tools", Desalination, vol. 474, Jan. 15, 2020, 114193, pp. 1-18.

Alex R. Bartman, et al., "Model-predictive control of feed flow reversal in a reverse osmosis desalination process", Journal of Process Control 19, Year 2009, p. 433-442.

Alexander Drak, et al., "Laboratory technique for predicting the scaling propensity of RO feed waters", Desalination 132, Year 2000, pp. 233-242.

Alice Antony, et al., "Scale formation and control in high pressure membrane water treatment systems: A review", Journal of Membrane Science 383, Year 2011, pp. 1-16.

Amer Sweity, et al., "The influence of antiscalants on biofouling of RO membranes in seawater desalination" Water Research 47, Year 2013, pp. 3389-3398.

Amitesh Saha, et al., New Insights into the Transformation of Calcium Sulfate Hemihydrate to Gypsum Using Time-Resolved Cryogenic Transmission Electron Microscopy, Langmuir 2012, 28, pp. 11182-11187.

Anand Venkatesan, et al., "Simulation of ion exchange water softening pretreatment for reverse osmosis desalination of brackish water", Desalination vol. 271, Issues 1-3, Apr. 15, 2011, pp. 122-131.

Anditya Rahardianto, et al., "Accelerated desupersaturation of reverse osmosis concentrate by chemically-enhanced seeded precipitation", Desalination vol. 264, Issue 3, Dec. 31, 2010, pp. 256-267.

Anditya Rahardianto, et al., "Diagnostic characterization of gypsum scale formation and control in RO membrane desalination of brackish water", Journal of Membrane Science 279, Year 2006, pp. 655-668.

Anditya Rahardianto, et al., "High recovery membrane desalting of low-salinity brackish water: Integration of accelerated precipitation softening with membrane RO", Journal of Membrane Science 289, Year 2007, pp. 123-137.

Anditya Rahardianto, et al., "Reverse Osmosis Desalting of Inland Brackish Water of High Gypsum Scaling Propensity: Kinetics and Mitigation of Membrane Mineral Scaling", Environ. Sci. Technol. 2008, 42, pp. 4292-4297.

Anna Jawor, et al., "Effects of feed water temperature on inorganic fouling of brackish water RO membranes", Desalination vol. 235, Year 2009, pp. 44-57.

Asif Matin, et al., "Scaling of reverse osmosis membranes used in water desalination: Phenomena, impact, and control; future directions", Desalination vol. 455, Apr. 1, 2019, pp. 135-157.

Baoxia Mi, et al., "Gypsum Scaling and Cleaning in Forward Osmosis: Measurements and Mechanisms", Environ. Sci. Technol. 2010, 44, pp. 2022-2028.

Bo Cao, et al., "Gypsum scale formation on graphene oxide modified reverse osmosis membrane", Journal of Membrane Science vol. 552, Apr. 15, 2018, pp. 132-143.

Bongyeon Jung, et al., "Enhancing boron rejection on electrically conducting reverse osmosis membranes through local electrochemical pH modification", Desalination 476, Year 2020, 114212, pp. 1-10.

Brian C. McCool, et al., "Feasibility of reverse osmosis desalination of brackish agricultural drainage water in the San Joaquin Valley", Desalination vol. 261, Issue 3, Oct. 31, 2010, pp. 240-250.

Charis M. Galanakis, et al., "Nanofiltration of brackish groundwater by using a polypiperazine membrane", Desalination vol. 286, Feb. 1, 2012, pp. 277-284.

D.E. Abd-El-Khalek, et al., "Evaluation of sodium hexametaphosphate as scale and corrosion inhibitor in cooling water using electrochemical techniques", Desalination vol. 311, Feb. 15, 2013, pp. 227-233.

David Hasson, et al., "Development of the electrochemical scale removal technique for desalination applications", Desalination vol. 230, Year 2008, pp. 329-342.

David M. Warsinger, et al, "Inorganic fouling mitigation by salinity cycling in batch reverse osmosis", Water Research 137 Year 2018, pp. 384-392.

Denis Gebauer, et al, "Prenucleation clusters and non-classical nucleation", Nano Today (2011) 6, pp. 564-584.

Denis Gebauer, et al., "Stable Prenucleation Calcium Carbonate Clusters", New Series, vol. 322, No. 5909 (Dec. 19, 2008), pp. 1819-1822.

Farah Ahmed, et al, "Electrically conductive polymeric membranes for fouling prevention and detection: A review", Desalination vol. 391, Year 2016, pp. 1-15.

Fusun Tut Haklidira, et al., "Fuzzy control of calcium carbonate and silica scales in geothermal systems", Geothermics 70, Year 2017, pp. 230-238.

H. Moosmuller, et al., "Small and large particle limits of single scattering albedo for homogeneous, spherical particles", Journal of Quantitative Spectroscopy & Radiative Transfer 204, Year 2018, pp. 250-255.

Hai-Yan Li, et al., "Inhibition of calcium and magnesium-containing scale by a new antiscalant polymer in laboratory tests and a field trial", Desalination 196, Year 2006, pp. 237-247.

Han Gu et al., "Self-adaptive feed flow reversal operation of reverse osmosis desalination", Desalination vol. 308, Jan. 2, 2013, pp. 63-72.

Hans Moosmuller, et al., "Particle Optics in the Rayleigh Regime", J. Air & Waste Manage. Assoc. 59, pp. 1028-1031.

Huawen Peng, et al, "Surface modified polyamide nanofiltration membranes with high permeability and stability", Journal of Membrane Science vol. 592, Dec. 15, 2019, pp. 1-8.

International Search Report and Written Opinion for PCT PCT/US2021/061426 DTD Feb. 28, 2022.

J.S. Vrouwenvelder, et al., "Biofouling potential of chemicals used for scale control in RO and NF membranes", Desalination 132, Year 2000, pp. 1-10.

Jan Benecke, et al., "Investigating the development and reproducibility of heterogeneous gypsum scaling on reverse osmosis membranes using real-time membrane surface imaging", Desalination vol. 428, Feb. 15, 2018, pp. 161-171.

Jane Kucera, "Reverse Osmosis Membrane Fouling Control", The Science and Technology of Industrial Water Treatment, p. 1-24.

Javier Rioyo, et al., "Research on 'high-pH precipitation treatment' for RO concentrate minimization and salt recovery in a municipal groundwater desalination facility", Desalination vol. 439, Aug. 1, 2018, pp. 168-178.

Jiayu Tian, et al., "How to fabricate a negatively charged NF membrane for heavy metal removal via the interfacial polymerization between PIP and TMC?", Desalination 491, Year 2020, 114499, pp. 1-10.

Jingyuan Fei, et al., "Membrane structure-dependent limiting flux behavior and membrane selectivity loss during gypsum scaling: Implications for pressure-retarded osmosis operation and membrane design" Desalination 492, Year 2020, pp. 1-9.

John A. Bush, et al., "Prevention and management of silica scaling in membrane distillation using pH adjustment", Journal of Membrane Science vol. 554, May 15, 2018, pp. 366-377.

(56) References Cited

OTHER PUBLICATIONS

Khaled Walha, et al., "Brackish groundwater treatment by nanofiltration, reverse osmosis and electrodialysis in Tunisia: performance and cost comparison", Desalination 207, Year 2007, pp. 95-106.
Leonard D. Tijing, et al., "Effect of high-frequency electric fields on calcium carbonate scaling", Desalination vol. 279, Issues 1-3, Sep. 15, 2011, pp. 47-53.
Marian Turek, et al., "Prospects for high water recovery membrane desalination", Desalination vol. 401, Jan. 2, 2017, pp. 180-189.
Maxim Oshchepkov, et al., "Initial Stages of Gypsum Nucleation: The Role of Nano/Microdust", Minerals 2020, 10, 1083, pp. 1-13
Menachem Elimelech, et al, "A novel approach for modeling concentration polarization in crossflow membrane filtration based on the equivalence of osmotic pressure model and filtration theory", Journal of Membrane Science 145 Year 1998, pp. 223-241.
Michal Uchymiaka, et al., "Brackish water reverse osmosis (BWRO) operation in feed flow reversal mode using an ex situ scale observation detector (EXSOD)", Journal of Membrane Science 341, Year 2009, p. 60-66.
Mohammad Badruzzaman, et al., "Impacts of silica on the sustainable productivity of reverse osmosis membranes treating low-salinity brackish groundwater", Desalination vol. 279, Issues 1-3, Sep. 15, 2011, pp. 210-218.
Moumita Saharay, et al., "Dehydration-Induced Amorphous Phases of Calcium Carbonate", J. Phys. Chem. B 2013, 117, pp. 3328-3336.
Nancy H. Lin, et al., "Crystallization of calcium sulfate on polymeric surfaces", Journal of Colloid and Interface Science, 356, Year 2011, pp. 790-797.
Nicandro Porcelli, et al., "Chemical cleaning of potable water membranes: A review", Separation and Purification Technology 71, Year 2010, pp. 137-143.
Qian Liu, et al , "Inorganic scaling in reverse osmosis (RO) desalination: Mechanisms, monitoring, and inhibition strategies", Desalination, vol. 468, Oct. 15, 2019, 114065, pp. 1-17.
Rao et al. "Mineral Scale Prevention on Electrically Conducting Membrane Distillation 1-22 Membranes Using Induced Electrophoretic Mixing" Environ. Sci. Technol. 2020, 54, 6, 3678-3690; Feb. 24, 2020; entire document, especially abstract, p. E-C.
S. Verissimo, et al, "Influence of the diamine structure on the nanofiltration performance, surface morphology and surface charge of the composite polyamide membranes", Journal of Membrane Science 279, Year 2006, pp. 266-275.
Sarah E.H. Comstock, et al, "Treatment of nanofiltration and reverse osmosis concentrates: Comparison of precipitative softening, coagulation, and anion exchange", Water Research 45, Year 2011, pp. 4855-4865.
Sherub Phuntsho, et al, "Membrane scaling and flux decline during fertiliser-drawn forward osmosis desalination of brackish groundwater", Water Research 57, Year 2014, pp. 172-182.
Suhan Kim, et al., "Modeling concentration polarization in reverse osmosis processes", Desalination 186, Year 2005, pp. 111-128.
T. Koo, et al., "Silica fouling and cleaning of reverse osmosis membranes", Desalination 139, Year 2001, pp. 43-56.
Tamim Younos, "Environmental Issues of Desalination", Journal of Contemporary Water Research & Education Issue 132, Dec. 2005, pp. 11-18.
Tarek Kamal Abdalla Waly, "Minimizing the Use of Chemicals To Control Scaling in SWRO", document.
Unnati Rao, et al., "Mineral Scale Prevention on Electrically Conducting Membrane Distillation Membranes Using Induced Electrophoretic Mixing", Environ. Sci. Technol. 2020, 54, pp. 3678-3690.
Wen-Yi Shih, et al, "Morphometric characterization of calcium sulfate dihydrate (gypsum) scale on reverse osmosis membranes", Journal of Membrane Science 252, Year 2005, pp. 253-263.
Wenxiang Zhang, et al., "A Review on Flux Decline Control Strategies in Pressure-Driven Membrane Processes", Ind. Eng. Chem. Res. 2015, 54, pp. 2843-2861.
Wenyan Duan, et al, "Treating anaerobic sequencing batch reactor effluent with electrically conducting ultrafiltration and nanofiltration membranes for fouling control", Journal of Membrane Science vol. 504, Apr. 15, 2016, pp. 104-112.
Wenyan Duan, et al., "Electrochemical mineral scale prevention and removal on electrically conducting carbon nanotube—polyamide reverse osmosis membranes", Cite this: Environ. Sci.: Processes Impacts, 2014, 16, 1300-1308.
Xiaobo Zhu, et al., "Electroactive Membranes for Water Treatment: Enhanced Treatment Functionalities, Energy Considerations, and Future Challenges", Acc. Chem. Res. 2019, 52, pp. 1177-1186.
Xiaotong Xu, et al, "Conductive thin film nanocomposite forward osmosis membrane (TFNFO) blended with carbon nanoparticles for membrane fouling control", Science of the Total Environment 697, Year 2019, p. 1-9.
Yun Chul Woo, et al., "Effect of chemical cleaning conditions on the flux recovery of fouled membrane", Desalination and Water Treatment 51, Year 2013, pp. 5268-5274.
Z. Amjad, et al., "Calcium Sulfate Dihydrate (Gypsum) Scale Formation on Heat Exchanger Surfaces: The Influence of Scale Inhibitors", Journal of Colloid and Interface Science, vol. 123, No. 2, Jun. 1988.

PREVENTION OF MINERAL SCALE ON ELECTRICALLY CONDUCTING MEMBRANES

CROSS-REFERENCE TO RELATED APPLICATIONS

This application is a 371 National Stage Entry of International Application No. PCT/US2021/061426, filed Dec. 1, 2021, which claims the benefit of priority to U.S. Provisional Patent Application No. 63/123,133 filed Dec. 9, 2020, each of which are hereby incorporated by reference, in their entirety for any and all purposes.

STATEMENT REGARDING FEDERALLY SPONSORED RESEARCH OR DEVELOPMENT

This invention was made with government support under Grant Number DE-AC36-08GO28308, awarded by the Department of Energy. The government has certain rights in the invention.

BACKGROUND

Membrane-based desalination technologies have been demonstrated to be the most energy efficient methods to produce fresh water from saltwater. However, membrane-based desalination technologies (and indeed, many other industrially important surfaces, such as heat exchangers) can experience multiple forms of surface fouling. In a desalination membrane, the passage of water through the membrane can lead to the formation of a stagnant concentration polarization (CP) layer along the membrane surface. In this layer, the concentration of ions can exceed the solubility limit of certain sparingly soluble salts, which can form a deposit layer on the membrane surface, referred to as mineral scale. Mineral scaling blocks the membrane's pores, which restricts the passage of water (either liquid or vapor), and can physically damage the membrane's fragile structure. The conditions controlling the formation of mineral scale vary widely, and depend on feed water chemistry (e.g., pH and dissolved species), feed physical conditions (e.g., temperature and mixing), and membrane surface properties (e.g., roughness, charge, and hydrophilicity). The degree of water recovery, i.e. the percentage of the feed water volume that becomes product water, in desalination is largely controlled by fouling, with mineral scaling being the primary constraint of achieving high recoveries in groundwater desalination, because groundwater contains many multivalent ions that tend to form sparingly-soluble minerals (e.g., $CaSO_4$, $CaCO_3$, and $(SiO^{(4-2x)-}_{4-x})_n$). There is a strong environmental and economic incentive to increase water recovery during desalination, as this reduces the volume of waste brine that has to be disposed. Indeed, mineral scaling has an impact on other industrial processes, notably heat exchangers, which reduces their efficiency due to the buildup of poorly conductive layers on an exchanger surface. The precipitation of minerals from solution can occur via a homogeneous (slow) or heterogeneous (fast) precipitation process. The conditions inside a membrane desalination system favor heterogeneous precipitation, due to the presence of a solid/liquid interface (namely, the membrane/feed stream), which can lead to rapid membrane scaling.

SUMMARY

In one aspect, a membrane desalination system includes a housing, an electrically conductive membrane disposed within the housing, and an electrical power source connected to the electrically conductive membrane. In some embodiments, the electrical power source is an alternating current power source. In other embodiments, the electrically conductive membrane includes a porous support and an electrically conductive layer disposed on the porous support, and the electrically conductive layer includes nanostructures.

In some embodiments, the nanostructures are electrically conductive. In some embodiments, the nanostructures form a percolating network. In some embodiments, the nanostructures include nanotubes, nanowires, or both. In some embodiments, the nanostructures include carbon nanotubes. In some embodiments, the electrically conductive layer further includes a polymer. In some embodiments, the polymer is cross-linked with the nanostructures. In some embodiments, the electrically conductive layer is porous. In some embodiments, the electrically conductive layer has a pore size that is about the same as or larger than a pore size of the porous support.

In some embodiments, the porous support is a filtration membrane.

In some embodiments, the membrane desalination system further includes a counter electrode disposed adjacent to the electrically conductive membrane and the electrical power source is connected to the counter electrode and the electrically conductive membrane.

In another aspect, a method of imparting a surface with resistance against mineral scaling includes providing an electrically conductive layer on the surface, wherein the electrically conductive layer includes nanostructures, and applying an electrical potential to the electrically conductive membrane. In some embodiments, the applying the electrical potential includes applying an alternating current.

In some embodiments, the nanostructures are electrically conductive. In some embodiments, the nanostructures form a percolating network. In some embodiments, the nanostructures include nanotubes, nanowires, or both. In some embodiments, the nanostructures include carbon nanotubes. In some embodiments, the electrically conductive layer further includes a polymer. In some embodiments, the polymer is cross-linked with the nanostructures. In some embodiments, the electrically conductive layer is porous. In some embodiments, the surface is a surface of a filtration membrane. In some embodiments, the surface is a heat exchange surface.

DETAILED DESCRIPTION

Figure 1A:
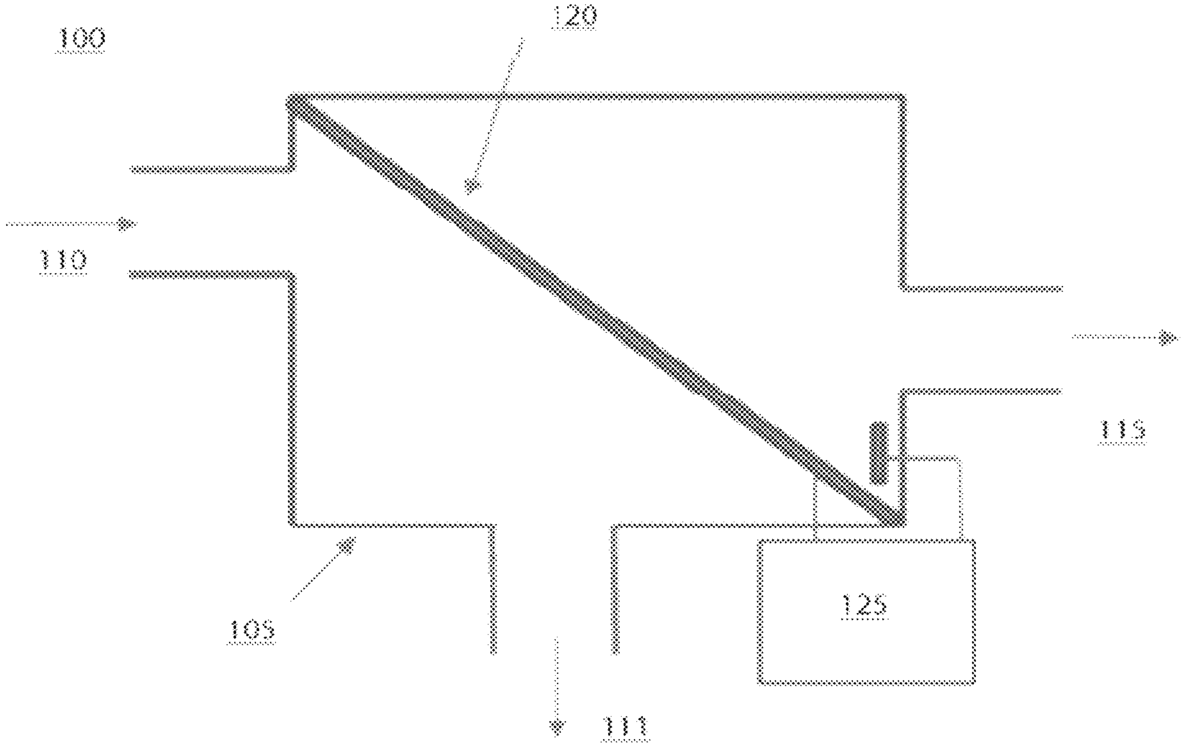
FIG. 1A is a schematic of a membrane desalination system including an electrically conductive membrane, according to some embodiments.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As disclosed herein it is demonstrated how electrically conducting nanofiltration (ECNF) membranes, fabricated by cross-linking a percolating network of carbon nanotubes with a polyamide polymer, can be used to prevent the formation of mineral scaling during the treatment of synthetic and natural groundwater. Application of an alternating current to the surface of the membrane is shown herein to prevent/minimize irreversible membrane scaling, and allows the membrane to increase water recovery without a significant energy penalty. In addition, the application of alternating potentials to the surface of metal electrodes immersed in a supersaturated solution is demonstrated to significantly delay the formation of bulk crystallization, further illustrating that the method may be applicable to other systems where scaling is an issue, such as heat exchangers. Also disclosed is the fabrication and characterization of carbon nanotube (CNT)-based electrically conducting nanofiltration (ECNF) membranes, and use them to treat both synthetic and natural brackish groundwater (BGW). It will be shown below that the application of alternating current (AC) conditions to the membrane surface successfully controls the formation of mineral crystals and membrane fouling. In addition, the techniques can be applied to other conducting surfaces: by immersing two titanium plates into a supersaturated $CaSO_4$ solution and applying AC conditions to the plates to provide for a slowing of homogeneous nucleation.

FIG. 1A is a schematic of a membrane desalination system including an electrically conductive membrane, according to some embodiments. As shown, the membrane desalination system 100 includes a housing 105 including an inlet 110, a concentrate outlet 111, a permeate outlet 115, and the electrically conductive membrane 120 disposed within the housing 100 between the inlet and the permeate outlet. In some embodiments, the electrically conductive membrane includes a porous support that is coated with a percolating network of nanostructures (e.g., carbon nanotubes (CNTs)) and cross-linked with a polymer to form a robust, porous, and electrically conductive coating or layer on the porous support. The porous support may be polymeric (such as formed of, or including, poly(sulfone), poly(ether sulfone), poly(vinylidene fluoride), poly(tetrafluoroethylene), poly(propylene), poly(acrylonitrile), another polymer, or a combination of two or more thereof) or inorganic (such as formed of, or including, alumina, zirconia, stainless steel, nickel, another ceramic, another metal, another metal alloy, or a combination of two or more thereof). For example, the porous support may be a filtration membrane, such as a reverse osmosis membrane.

In the electrically conductive membrane of some embodiments, the nanostructures provide electrical conductivity, while the cross-linking polymer provides a matrix that links the nanostructures and affixes the nanostructures to the porous support, as well as being used to control a pore size between the nanostructures. The nanostructures may be formed of, or can include, an electrically conductive material, such as carbon, a metal, a metal alloy, a metal oxide, or a combination of any two or more thereof. In some embodiments, at least a subset of the nanostructures corresponds to high aspect ratio nanostructures, such as nanotubes, nanowires, or a combination of nanotubes and nanowires. High aspect ratio nanostructures can increase the occurrence of junction formation between neighboring nanostructures, and can form an efficient charge transport network. For example, the nanostructures may be CNTs, such as single-walled CNTs, multi-walled CNTs, or a combination thereof. It is also contemplated that nanoparticles may be used in combination with, or in place of, high aspect ratio nanostructures. In some embodiments, the nanostructures are functionalized with, for example, carboxyl groups (—COOH), hydroxyl groups (—OH), amine groups (e.g., $—NH_2$), or other functional groups to allow cross-linking with the polymer. Likewise, the polymer can include functional groups to allow cross-linking, such as carboxyl groups, hydroxyl groups, amine groups, or other functional groups. Examples of the polymer include poly(vinyl alcohol), poly (aniline), and polysiloxanes (e.g., polydimethylsiloxane (PDMS)). Upon cross-linking of the nanostructures and the polymer, the resulting electrically conductive layer on the porous support can have a pore size that is about the same as or larger than a pore size of the porous support. A thickness of the electrically conductive layer may be about 100 nm or greater, about 200 nm or greater, about 300 nm or greater, about 400 nm or greater, or about 500 nm or greater, and up to about 1 μm or greater, up to about 5 μm or greater, or up to about 10 μm or greater. An electrical conductivity of the layer may be about 500 S/m or greater, about 800 S/m or greater, or about 1000 S/m or greater, and up to about 1500 S/m or greater, up to about 2000 S/m or greater, or up to about 2500 S/m or greater.

During operation of the system for water desalination, the electrical conductivity of the membrane allows for the application of an electrical potential to a surface of the membrane, which imparts the membrane with resistance against mineral scaling. Referring to FIG. 1A, the membrane may be connected to an electrical power source 125. In some embodiments, the electrical power source is an alternating current power source. A peak voltage supplied by the power source may be at least about 0.1 V. For example, the peak voltage supplied may be at least about 0.5 V. In some embodiments, the peak voltage supplied may be up to about 10 V or greater, including up to about 50 V or greater or up to about 100 V or greater, at a frequency of at least about 0.1 Hz or at least about 0.5 Hz and up to about 10 Hz or greater, or up to about 50 Hz or greater, or up to about 100 Hz or greater. In some embodiments, the peak voltage supplied may be from about 0.1V to about 100 V at a frequency of about 0.1 Hz to about 10,000 Hz. In some embodiments, the electrical power source is a direct current power source. To complete an electrical circuit, a counter electrode may be provided adjacent to the membrane, and may be connected to the same electrical power source.

Figure 1B:
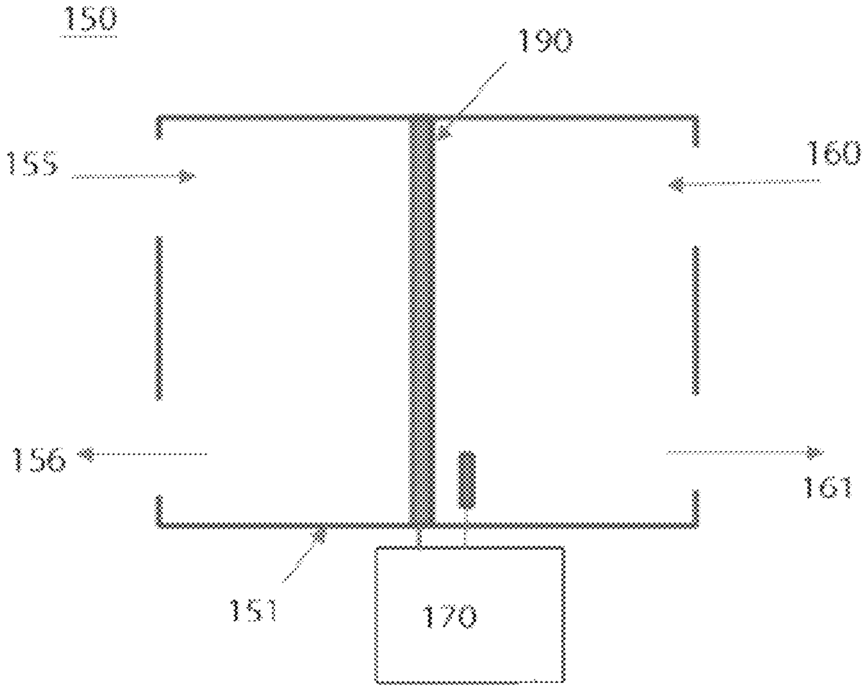
FIG. 1B is a schematic of a heat exchanger, according to some embodiments.

The mechanism of imparting resistance against mineral scaling may be applied to other industrial systems and processes, including heat exchangers. FIG. 1B is a schematic of a heat exchanger, according to some embodiments. As shown, the heat exchanger 150 includes a housing 151 including a primary fluid inlet 155, a primary fluid outlet 156, a secondary fluid inlet 160, a secondary fluid outlet 161, and a heat exchange wall 190 disposed within the housing 151 and separating a flow of a primary fluid and a flow of a secondary fluid. The heat exchange wall 190 may include a thermally conductive barrier that serves as a support and that is coated on one or both opposing heat exchange surfaces with a percolating network of nanostructures and cross-linked with a polymer to form a robust, porous, and electrically conductive coating or layer. Aspects of the electrically conductive coating, the nanostructures, and the polymer may be similarly implemented as explained above in connection with FIG. 1A. During operation of the heat exchanger, the electrical conductivity of the coating allows for the application of an electrical potential to the heat exchange wall, which imparts the wall with resistance against mineral scaling. Referring to FIG. 1B, the wall may be connected to an electrical power source, which may be an alternating current power source. To complete an electrical circuit, a counter electrode is provided adjacent to the wall, and is connected to the same electrical power source.

The present invention, thus generally described, will be understood more readily by reference to the following examples, which are provided by way of illustration and are not intended to be limiting of the present invention.

EXAMPLES

The examples should not be construed as limiting this disclosure, as the example merely provides specific methodology useful in understanding and practicing some embodiments of this disclosure.

General.

Feed solutions. Ion composition of model gypsum scaling solution, no-scaling solution, and natural groundwater is listed in Table 1.

TABLE 1

Concentrations of ions in gypsum scale, no-scaling solutions, and natural groundwater.

| Constituent | Concentration (mM) Synthetic BGW | No-scaling solution | Natural BGW |
|---|---|---|---|
| Na | 21.00 | 21 | 3.13 |
| Ca | 16.40 | 0 | 1.60 |
| Mg | 14.50 | 30.91 | 2.29 |
| Cl | 32.81 | 65.61 | 3.63 |
| $SO_4$ | 25.01 | 25.01 | 3.25 |
| $HCO_3$ | 0 | 0 | 2.13 |
| Si | 0 | 0 | 0.32 |
| pH | 5.61 | 5.82 | 8.47 |
| Conductivity (mS/cm) | 6.3613 | 6.3113 | 1.2023 |
| Total dissolved solids (mg/L) | 5,058 | 4,799 | 1,024 |

Calcium chloride ($CaCl_2 \cdot H_2O$), magnesium sulfate ($MgSO_4 \cdot 6H_2O$), sodium chloride (NaCl), were purchased from Fisher scientific, and used as received. All synthetic solutions were prepared with DIW. Natural groundwater sample was provided by Santa Monica Water Treatment Plant (Santa Monica, CA) and pretreated with a filter cartridge in order to remove suspended solids.

The extent of scale tendency of solutions was quantified in terms of $SI_g$, defined as:

$$SI_g = \frac{(\alpha_a)(C_a)\times(\alpha_b)(C_b)}{K_{SP}}$$

where α is activity of scalant, C is molar concentration of scalant, and $K_{SP}$ is solubility product. Model gypsum scale solution has a $SI_g$ of 0.96 in terms of gypsum, while natural groundwater has $SI_g$ of 1.98 in terms of $CaCO_3$, and $SI_g$ of 0.05 in terms of gypsum. The $SI_g$ was calculated using OLI software.

ECNF fabrication. Procedures to fabricate ECNF membranes followed previously reported method except piperazine (PIP, Alfa Aesar) was used to cast polyamide instead of m-phenylenediamine[60]. In brief, carboxyl-functionalized carbon nanotubes (CNT, Cheaptubes Inc.) suspension solution was prepared by sonicating a mixture of CNT and surfactant (sodium dedocylbenzensulfonate, Sigma Aldrich). Afterwards, certain volume of the suspension solution was pressure-deposited on PSfmembrane support (PS35, Solatec). Then, the fabricated CNT-membrane was immersed in a 2% PIP aqueous solution for one hour. Plastic roller was used to remove excessive amount of PIP on the membrane surface, followed by soaking the membrane in 0.15% 1,3,5-benzenetricarboxylic acid chloride (TMC, Sigma-Aldrich) in hexane (Fisher Scientific) for 2 minutes. Finally, the membrane was cured at 80° C. for 5 minutes.

System design and operation. A membrane coupon (effective area of 0.004 $m^2$) was placed into a custom-built crossflow membrane cell, and conditioned with DIW overnight until stable permeate flux is obtained. Pure water permeate flux of membranes was measured at the end of conditioning. Then, feed solution was fed into the feed tank, and pressure in the system was adjusted to achieve initial permeate flux of 40 LMH for gypsum scale solution and no-scaling solution, and 50 LMH for natural groundwater. Then, constant pressure was applied over the course of experiment. Higher initial flux for natural groundwater was applied to facilitate concentration polarization, which enhances the nucleation of scale on membrane surface. The filtration system was operated at cross flow velocity of 4.66 cm/s (corresponding to Reynolds number of 158), and operated in concentration mode where permeate stream is constantly disposed while brine stream is recycled until water recovery reaches at a desired point. For testing gypsum scale solution, a filter cartridge (0.45 μm) was placed in brine stream so as to avoid bulk crystallization of gypsum in the feed tank. For testing natural groundwater, 1 μm filter cartridge was employed to minimize the hold-up volume of cartridge to achieve a high recovery (i.e. 85%) with a given feed volume (3 L). Samples from feed and permeate were periodically collected to monitor observed salt rejection, defined as $R_{obs}=(1-\gamma_p/\gamma_f)$, where $\gamma_p$ and $\gamma_f$ are conductivity in permeate and feed, respectively.

Once water recovery reached to the target recovery (55% for synthetic solution and 85% for natural water), membrane cleaning practice was conducted to test reversibility of membrane performance (i.e., water flux and salt rejection) using deionized water (DIW) for synthetic solution, and hydrochloric acid (HCl, Fisher Scientific) for natural groundwater. Scaled membrane with synthetic solution was rinsed by DIW for 30 minutes, and membrane scaled with natural groundwater was soaked in a HCl solution (pH 2) for 1 hour. Then, a new solution was fed as a feed to test reversibility of membrane performance.

Water quality analysis. Water quality (pH, conductivity, anion and cation concentrations) of feed and permeate samples was monitored to compare the performance of ECNF membranes over the course of experiment. pH and conductivity of samples were immediately measured after the sample collection using portable pH (Thermo Scientific, Orion 720A) and conductivity meter (Orion A321). Turbidity was measured using a turbidity meter (Hach, 2100P). Anion ($Cl^-$ and $SO_4^{2-}$) concentrations were measured by ion-chromatography (IC, Thermo Fisher, Dionex Integrion HPIC). Cation ($Na^+$, $Ca^{2+}$, and $Mg^{2+}$) and silicon concentration were measured by induced-couple plasma (ICP-OES, Shimadzu, ICPE9000). Inorganic carbon concentration was measured using a total organic carbon (TOC) analyzer (Shimadzu, TOC-L) by measuring inorganic carbon content.

Characterization of membrane surface. The surface of bare and scaled membrane was characterized using field-emission scanning electron microscopy (FESEM, Zeiss, Supra 40VP) equipped with energy-dispersive X-ray spectroscopy. EDAX provides an information about atomic composition of the surface being taken. Contact angle measurement was conducted using a contact angle goniometer (Rame-hart, model 250) to compare the degree of hydrophobicity/hydrophilicity of the membrane surface in different fabrication steps. DIW was used for contact angle measurement, and at least 10 different area of each membrane piece were taken. The sheet resistance of fabricated ECNF membrane was measured using 4-poing probe (Mitsubishi, MCP-T610). At least, 5 different points of the membrane surface were measured.

Example 1. The kinetics of mineral scale formation during membrane desalination. These investigations determined that the rate of scale formation is dependent on the degree of supersaturation, with the period of time between the onset of supersaturation and the formation of mineral scaling specified as the "induction period." During the heterogeneous precipitation process, mineral "pre-nucleation clusters," numbering just a few atoms, can rapidly form (within seconds) in areas with the highest concentration (e.g., at the membrane/water interface). These clusters may aggregate and attach to a surface and serve as induction sites for crystal growth, where dissolved ions from the surrounding solution combine with the growing crystal. Thus, to prevent the formation of mineral scale, an ideal system would minimize the formation of these pre-nucleation clusters, prevent any of these clusters from reaching a membrane surface, and constrain subsequent growth of a robust surface crystal structure.

The surface charge on the surface of a membrane may impact the formation of mineral scale, with negatively charged surfaces (e.g. those rich in —COOH groups) being more scaling resistant than positively charged surfaces (e.g., rich in quaternary amine groups). However, when a DC external anodic potential (e.g., 1.5 V cell potential) was applied to the surface of an electrically conductive reverse osmosis (RO) membrane, $CaSO_4$ scaling was significantly delayed. The anti-scaling phenomenon was explained through the formation of a thick electric double layer (EDL), which developed in response to the applied potential. In the EDL, the concentrations of co-ions were depleted relative to those of counter-ions, thereby reducing the formation of crystal nuclei by locally lowering the saturation index (SI), and slowing mineral scaling. These results indicate that external control of ion concentrations along a surface can substantially impact the rate of nucleation, and potentially prevent mineral scaling.

In this example, it is reported that efficient anti-scaling methods may employ AC applied to the surface of an electrically conductive membrane. The method is applied to prevent both gypsum ($CaSO_4$) and silicate scaling, both of which are common scaling species encountered during desalination.

Scaling occurs when ions accumulate in a concentration polarization (CP) layer, with the highest concentrations at the membrane surface and decaying from the surface into the bulk. Supersaturation conditions are likely to develop in the CP layer first, leading to heterogeneous crystal nucleation and growth on the membrane surface, and resulting in flux decline. The SI values along the membrane surface in experiments were determined to be about 2.28 and about 3.18 for $CaSO_4$ and silicate, respectively. These values indicate that supersaturated conditions did indeed develop along the membrane surface, and mineral scaling would likely occur, given sufficient time. Importantly, an SI of about 2.3 is considered the highest SI where anti-scalant chemicals are capable of minimizing $CaSO_4$ scaling, emphasizing the difficult nature of the operating conditions employed herein.

Electrically conductive membranes are demonstrated to be highly effective at preventing multiple forms of fouling, including organic, colloidal, and biofouling. These membranes are fabricated by combining a percolating network of carbon nanotubes (CNTs) into an active layer of a membrane. A cross-linking polymer (poly(vinyl alcohol) or PVA) is used to secure the CNTs in place and endow a resulting composite with surface and transport properties for a particular separation.

The normalized (to time zero) flux during the treatment of solutions prone to $CaSO_4$ and silicate scaling may be seen in FIGS. 2*a* and 2*b*, respectively. The average flux decline rate (liters/m$^2$/hour or LMH hr$^{-1}$) is determined by fitting a linear function through the data points, and is shown by FIGS. 2*c* and 2*d*, along with the associated $R^2$ values. Based on the SI calculated for two feed solutions, the time scales for scaling should be significantly different. As observed, the silicate solution, having a higher SI, scaled the membrane in a much shorter time span. In addition to the high SI of the silicate solution, the presence of certain cations, such as calcium and magnesium, can promote silicate nucleation and polymerization during the fouling of desalination membranes.

Figure 2:
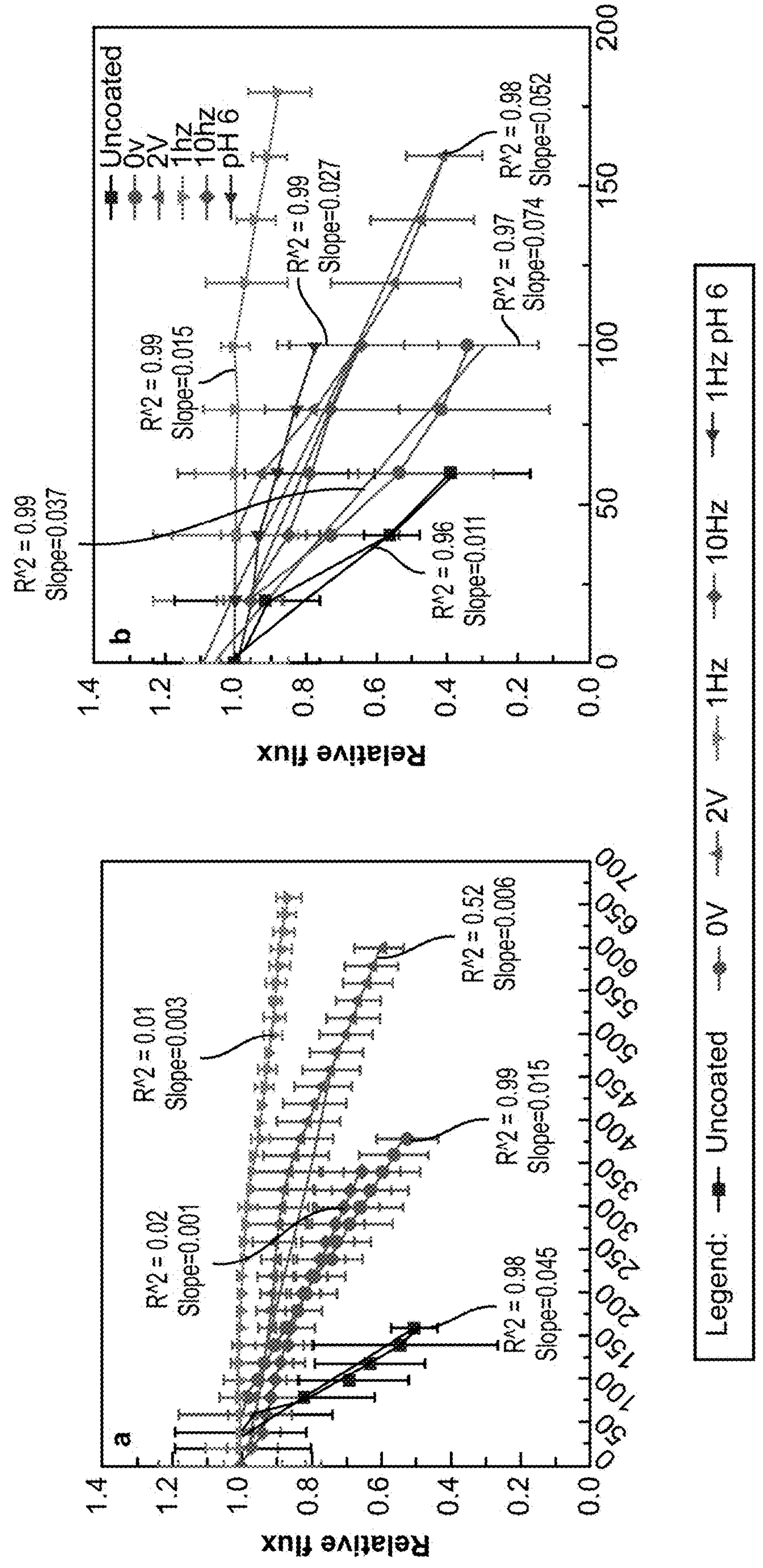
FIG. 2 is a graph of flux decline under different applied electrical conditions with (a) $CaSO_4$ and (b) silicate solutions as feed, and rate of flux decline under different conditions for (c) $CaSO_4$ and (d) silicate solutions, according to the examples.
Figure 2:
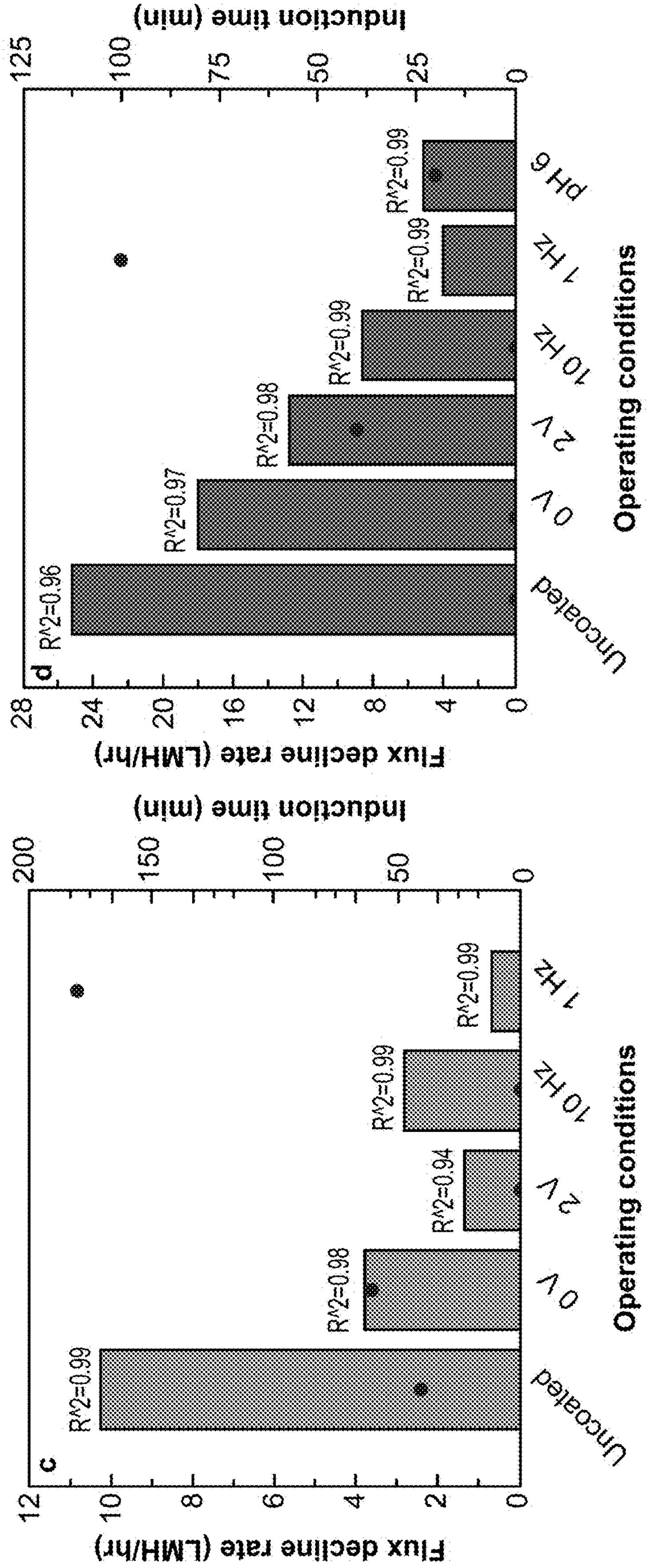

During the scaling experiments, some of the runs exhibited two distinct flux regimes: an initial period of no flux decline (namely, the induction period), and a period where flux decline occurred (FIG. 2). However, these two regimes were not noticeable in all experiments. For example, during the experiments with the uncoated membrane, rapid flux decline was immediately observed (FIGS. 2*a* and 2*b*). Linear functions are fitted through the region where flux decline did occur for each experimental condition tested (FIGS. 2*a* and 2*b*). The induction period of $CaSO_4$ and silicate scaling can manifest as a period with no flux decline, followed by a period of rapid flux decline and scaling. Similar observations are made during the scaling of NaCl. In the most successful experimental runs, there was a long induction time, with a slow flux decline observed later on during the experiments (e.g., when 2 $V_{AC,\ 1\ Hz}$ was applied, FIGS. 2*a* and 2*b*).

Because the trends in flux decline as a function of the applied surface potential were similar; discussion is made of the results of $CaSO_4$ and silicate scaling together. In both cases, an uncoated poly(propylene) (PP) support exhibited rapid flux decline, with a flux decline rate of about 10 LMH hr$^{-1}$ and about 25 LMH hr$^{-1}$, respectively (FIGS. 2*c* and 2*d*). These rates are in-line with the higher SI of the silicate solution, which would lead to more rapid precipitation relative to $CaSO_4$, and is also in agreement with observations where flux decline for silicate solutions begins almost instantly, while scaling by $CaSO_4$ has a non-zero induction period. Several striking observations emerge when viewing the scaling results on the carbon nanotube (CNT)/polyvinyl alcohol (PVA) membranes. Coating the PP support with the CNT/PVA composite increased the induction period for $CaSO_4$ from about 40 to about 60 minutes, and lowered the rate of both $CaSO_4$ and silicate scaling, reducing the rate of flux decline from about 10 LMH hr$^{-1}$ to about 3.75 LMH hr$^{-1}$ for $CaSO_4$ (about 62.5% decline) and from about 25 LMH hr$^{-1}$ to about 18 LMH hr$^{-1}$ for silicate (about 28% decline) (FIGS. 2*c* and 2*d*). This is in line with observations that indicate that the addition of a hydrophilic layer (here, CNT/PVA) onto a hydrophobic membrane reduces the degree of scaling. In general, hydrophilic surfaces are more resistant to scaling due to the presence of a tightly bound water layer at the membrane/water interface, which minimizes the attachment of foulants, including mineral scale.

The application of an electrical potential had a significant impact on both the length of the induction period and the rate of flux decline. For the case of $CaSO_4$ scaling, the application of an approximately 2 $V_{DC}$ cell potential did not increase the induction time, but did result in a drop in the rate of flux decline (compared to 0 V), from about 3.75 LMH hr$^{-1}$ to about 1.35 LMH hr$^{-1}$ (about 64% decline). For the silicate system, an approximately 2 $V_{DC}$ cell potential increased the induction time to about 40 minutes and reduced the rate of flux decline from about 18 LMH hr$^{-1}$ to about 12.5 LMH hr$^{-1}$ (about 30% decline) (FIGS. 2*a-d*). When an AC potential was applied to the membrane, the results were significantly different from the DC conditions. During $CaSO_4$ scaling, when an approximate 2 $V_{AC,\ 10\ Hz}$ potential was applied, the flux decline was worse than the about 2 $V_{DC}$ case (with a rate of about 2.82 LMH hr$^{-1}$ vs. about 1.35 LMH hr$^{-1}$), and no induction period was apparent (FIGS. 2*a* and 2*b*). However, when the silicate solution was treated during the application of an approximate 2 $V_{AC,\ 10\ Hz}$ potential, the flux decline rate decreased to about 8 LMH hr$^{-1}$, down from about 12.5 LMH hr$^{-1}$ under about 2 $V_{DC}$.

It is unclear why the silicate solution exhibited better performance under these conditions (2 $V_{AC,\ 10\ Hz}$), while the $CaSO_4$ performed worse.

For both scaling solutions, the best performance was observed when about 2 $V_{AC,\ 1\ Hz}$ cell potential was applied to the membrane surface. For the $CaSO_4$ case, the induction period increased dramatically to about 200 minutes, and the flux decline rate declined to about 0.7 LMH $hr^{-1}$ (about 81% smaller than at 0 V). For silicate, the induction time increased to about 100 minutes, and the rate of flux decline rate decreased to about 3.8 LMH $hr^{-1}$ (about 79% decrease vs. 0 V). However, when the pH of the silicate-rich feed solution was decreased to about 6, the rate of flux decline increased to about 4.2 LMH $hr^{-1}$ (when about 2 $V_{AC,\ 1\ Hz}$ was applied) and the induction period decreased to about 20 minutes (FIG. 2*b*). The acidity of silicate species is dependent on their molecular complexity, with more complex species exhibiting a lower pKa. Since the exact speciation of the silicates in the feed solutions are difficult to predict (and is likely a mix of several species), it is likely that reducing the pH of the feed solution will transform some (or all) of the silicates to their non-charged forms that do not respond to the applied electrical potential. Thus, it is consistent that membrane flux started declining after a shorter time, as silicate scaling was not effectively prevented through the application of the potential.

Figure 3:
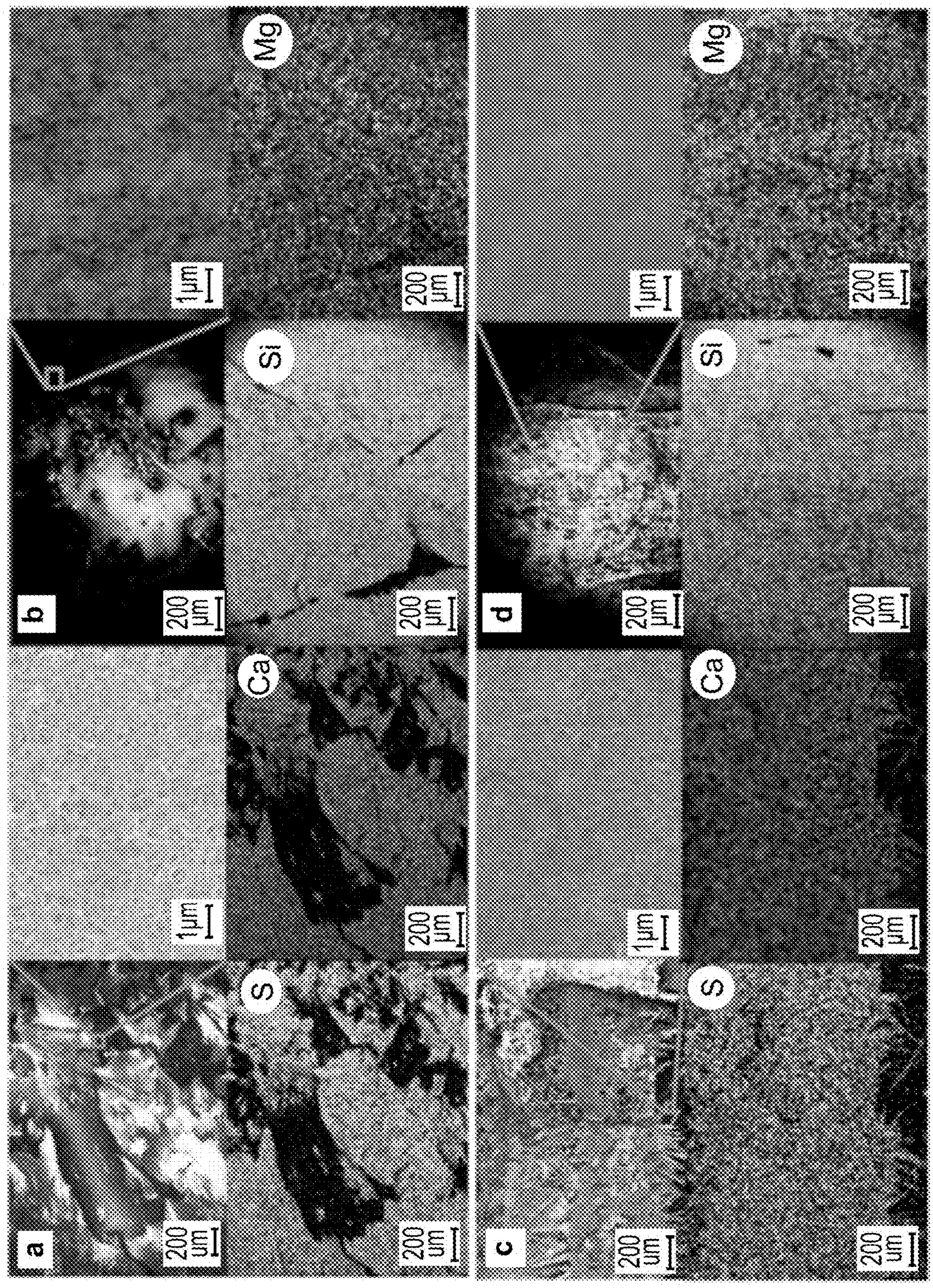
FIG. 3 shows scanning electron microscope (SEM) and energy-dispersive X-ray spectroscopy (EDAX) micrographs of membrane surfaces post scaling experiments under different applied electrical conditions for (a) $CaSO_4$, 0 V; (b) silicate, 0 V; (c) $CaSO_4$, about 2 $V_{DC}$; (d) silicate, about 2 $V_{DC}$; (e) $CaSO_4$, about 2 $V_{AC,\ 10\ Hz}$; (f) silicate, about 2 $V_{AC,\ 10\ Hz}$; (g) $CaSO_4$, about 2 $V_{AC,\ 1\ Hz}$; and (h) silicate, about 2 $V_{AC,\ 1}$ Hz, according to the examples.
Figure 3:
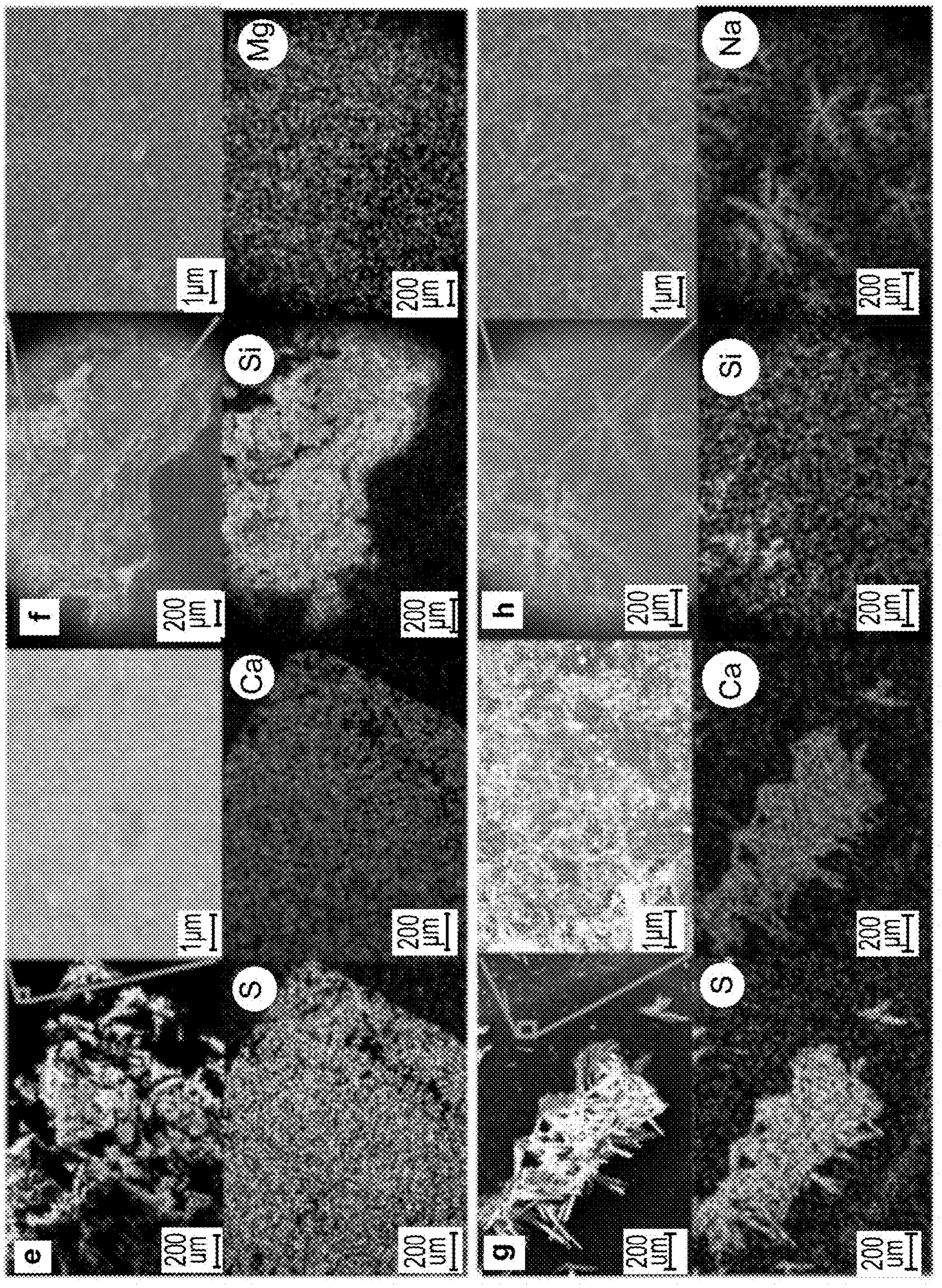

Scanning electron microscopy (SEM) of a $CaSO_4$-scaled CNT/PVA-coated membrane with no potential revealed a mixture of needle-like and plate-like crystals (FIG. 3*a*). The morphology of crystals depends on the SI and crystallization kinetics. Needle-like crystallization is associated with bulk crystallization, while plate-like formations are typically the result of surface crystallization. EDAX analysis showed that the membrane was primarily covered by a thick layer of calcium and sulfur (FIG. 3*a*). On the silicate-scaled membrane, a uniform colloidal layer was observed covering the surface (FIG. 3*b*). This is consistent with observation that the polymerization of silicate monomers in the presence of divalent cations results in a colloidal, gel-like scaling layer. Some structures were observed deposited on top of this silicate scaling layer. EDAX analysis of the deposits indicated that the surface was covered by silicon and magnesium containing minerals (FIG. 3*b*). Chrysotile ($Mg_3(Si_2O_5)(OH)_4$) is a mineral containing both silicon and magnesium and has a high SI in the feed solution. Thus, it is possible that some chrysotile crystals precipitated on the colloidal silicate layer. An SEM micrograph of the CNT/PVA membrane surface after about 2 $V_{DC}$ cell potential was applied while treating the $CaSO_4$ saturated solution shows a large number of needle-like crystals that are characteristic of bulk crystallization, indicating that bulk crystallization dominates scaling under about 2 $V_{DC}$ conditions (FIG. 3*c*). SEM and EDAX analysis of the silicate-scaled membrane after the application of about 2 $V_{DC}$ showed a similar colloidal layer interspersed with a larger number of magnesium-bearing crystals (FIG. 3*d*). SEM micrographs of the membrane surface after the application of about 2 $V_{AC,\ 10\ Hz}$ showed uniform crystal deposition throughout the membrane surface for both the $CaSO_4$ and silicate scaled membranes (FIGS. 3*e* and 3*f*). SEM micrographs of the $CaSO_4$-scaled membrane after about 2 $V_{AC,\ 1\ Hz}$ was applied to the membrane surface revealed a very sparse cover of sharp needle-like crystals, similar to those formed by the crystallization of gypsum in bulk liquid. A zoomed-in micrograph revealed the presence of smaller crystals (about 150 nm) on the surface (FIG. 3*g*). In FIG. 3*h*, the silicate-scaled membrane was not as thoroughly covered by silicon. For both $CaSO_4$ and silicate-scaled membranes, the CNT network was visible in the SEM micrographs, indicating poor surface coverage when about 2 $V_{AC,\ 1\ Hz}$ was applied. These observations match the flux decline observations, where under the about 2 $V_{AC,\ 1\ Hz}$ conditions, the membrane experienced dramatically less flux decline.

Figure 4:
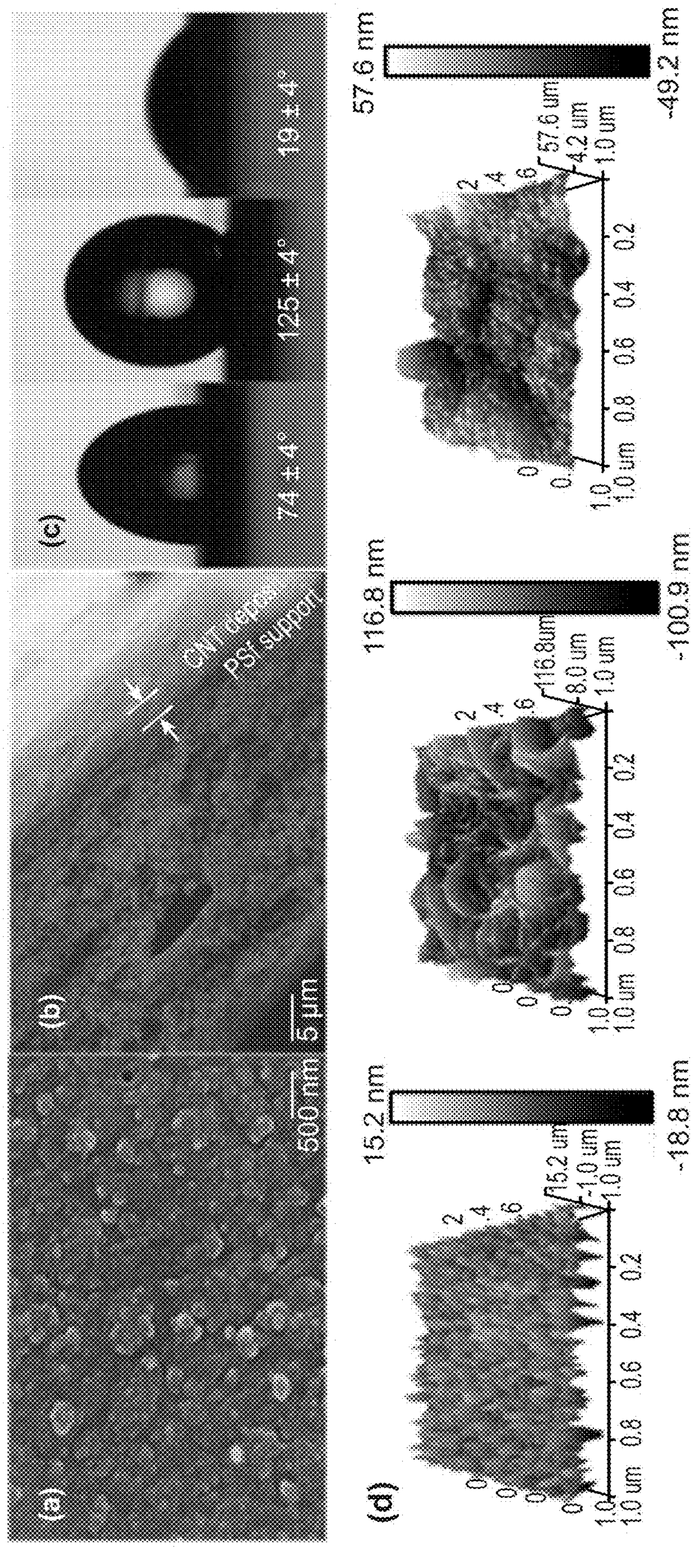
FIG. 4 illustrates the characterization of ECNF membranes: (a) top-view FESEM image of nodular structure of ECNF membrane; (b) Cross-sectional SEM image of ECNF membrane having 2 thick CNT-layer on top of PSf support; (c) Contact angle measurement of PSf support (left), CNT-deposited PSf support (middle), and ECNF (right); and (d) AFM images (scan area of 2 μm by 2 μm) of PSf support (left), CNT-deposited PSf support (middle), and ECNF (right), according to example 2.

Example 2. Characterization of ECNF membranes. ECNF membranes were fabricated by pressure-depositing a CNT suspension onto a porous polysulfone (PSf) support, followed by cross-linking the CNTs using a piperazine-based polyamide (the process is detailed in the materials and methods section). Field emission scanning electron microscope (FESEM) imaging of the surface of the ECNF show a nodular surface morphology, which is typical of piperazine-based polyamide materials used in NF membranes; cross-sectional analysis of the ECNF material shows that the thickness of the CNTs deposited on the PSf support was approximately 2 μm thick (FIGS. 4(*a*) and 4(*b*)).[46-48] While the contact angle of the PSf support was 74±4°, the addition of the CNT coating increased the contact angle to 125±4°; when the polyamide layer was used to cross-link the CNTs, the resulting contact angle of the final composite was a very hydrophilic 19±4° (FIG. 4(*c*)). AFM measurement show that the PSf support has a surface root mean square (RMS) roughness of 4.59 nm, while the CNT-deposited PSf support and ECNF have a surface roughness of 30.8 nm and 14.4 nm, respectively. The sheet resistance of the ECNF membrane was 135.57±11.52 Ω/sq, which translates into an electrical conductivity of 3707±284 S/m. The ECNF membranes were evaluated for their ability to reject NaCl and $MgSO_4$ solutions, with salt rejection values of 58.51±4.65% and 93.75±1.00%, respectively.

Figure 5:
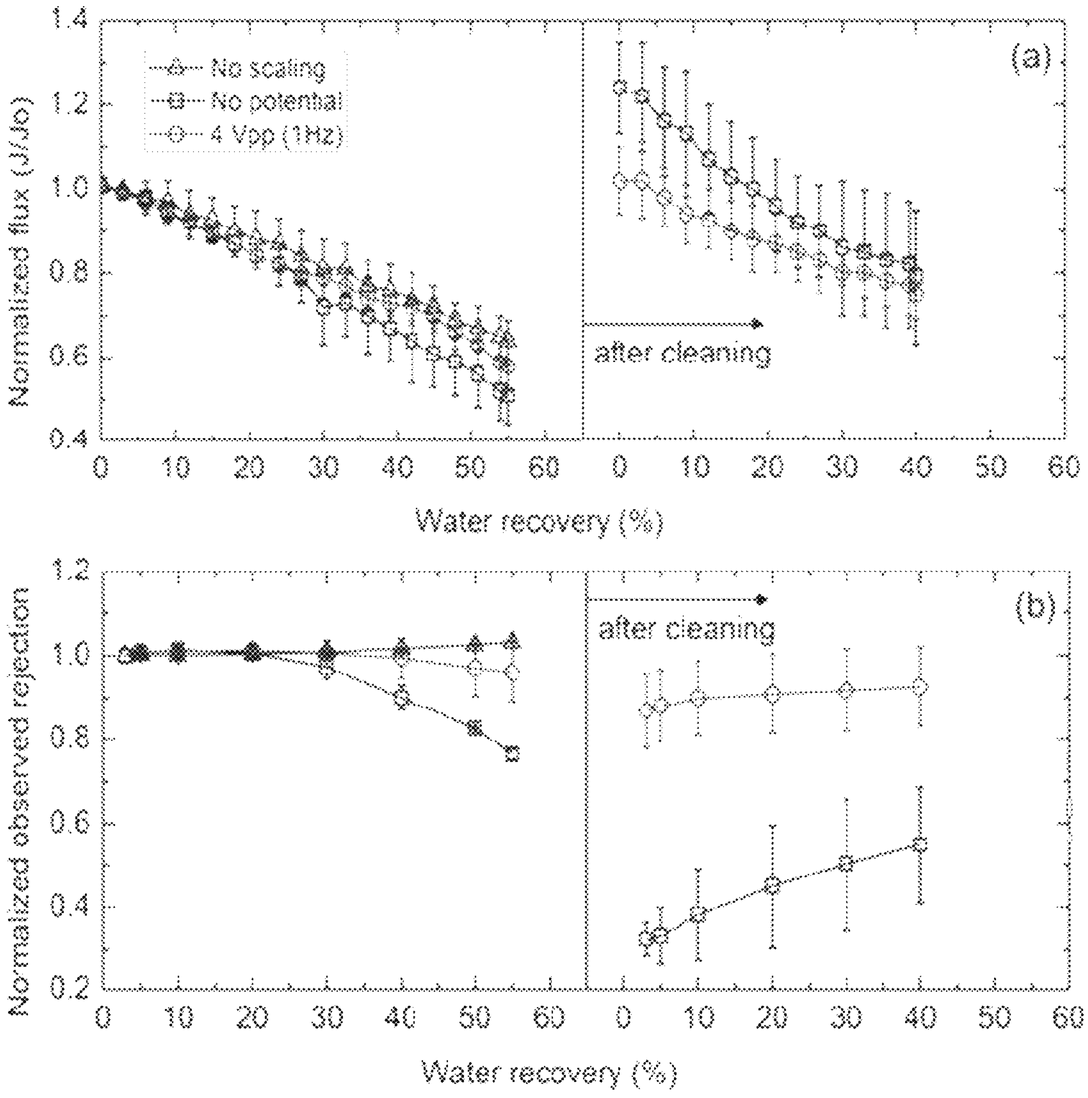
FIG. 5 illustrates the performance of ECNF treating synthetic BGW: (a) Normalized flux of ECNF membranes over water recovery under no potential, 4 $V_{pp}$, and no-scaling (with no potential) condition; and (b) Normalized observed salt rejection of ECNF over water recovery under no potential, 4 $V_{pp}$, and no-scaling (with no potential) condition; where Each figure shares the legend—no potential (black square), 4 $V_{pp}$ (red circle), and no-scaling (blue triangle), according to Example 2.

Performance of ECNF treating synthetic solutions. FIG. 5 shows the normalized flux and salt rejection of the ECNF membrane over the course of the experiment with a synthetic BGW solution (super-saturated with respect to $CaSO_4$) and a no-scaling solution, where Ca was replaced with an equimolar amount of Mg ($MgSO_4$ is highly soluble, and does not precipitate under the conditions tested). In the experiments, the initial flux was 27.27±2.12 $L/m^2$ hr. The no-scaling solution was used to separate the impact of osmotic pressure from membrane scaling when considering the flux decline experienced by the system over time. Under the experimental conditions, permeate flux decreased as water recovery increased due to the increase in osmotic pressure. At 55% water recovery, the flux of the no-scaling solution reached 64.45±4.82% of its initial flux (i.e., a 35.55% decline), while the flux of the synthetic BGW without applied potential was 50.59±6.87% of the initial flux (i.e., a 49.41% decline) at the same recovery (FIG. 5(*a*)). The higher flux decline suggests that $CaSO_4$ crystals did indeed form on the membrane, which obstructed the flow of water.[49,50] When 4 $V_{pp}$, 1 Hz conditions were applied to the membrane surface, the ECNF exhibited a normalized flux of 57.76±6.02% at 55% recovery (a 42.24% decline) (FIG. 5(*a*)). The higher water flux measured at 55% recovery under the 4 $V_{pp}$, 1 Hz conditions suggest less $CaSO_4$ crystal formation on membrane surface, resulting in a reduced flux decline.

The characteristic morphology of $CaSO_4$ crystals (long and needle-like) can result in damage to the membrane surface.[51,52] This damage is manifested in an observed decline in salt rejection. When the no-scaling solution was used, the observed salt rejection increased with water recovery (the salt rejection increased to 103±0.12% at 55% water recovery) (FIG. 5*b*). The increase in salt rejection with increasing recovery can be attributed to changes in the ion composition of the feed solution as the feed solution is concentrated throughout the experiment. Since the ECNF membranes have a lower rejection (~58%) of monovalent ions compared to the rejection of divalent ions (~93%), and because membrane permeate was not returned back to the feed, the molar ratio of monovalent ions to divalent ions in the feed solution decreased with increasing water recovery. At 3% recovery, the molar ratio of monovalent to divalent ions in the feed was 1.00, while the ratio was 0.74 at 55% recovery. As this ratio decreases, the membrane appears to have higher rejection; a similar observation has been previously reported.[53] When no potential was applied, the observed salt rejection increased until ~10% recovery, but decreased afterwards. At 55% recovery, the rejection reached 76.46±1.12% of its initial value, implying that the membrane was damaged. However, when the AC conditions were applied, salt rejection increased until 20% recovery, with the final rejection reached at 55% being 96.12±7.02%—not statistically different from the no-scaling solution case. This further suggests that scale formation was suppressed in the presence of the applied electrical conditions.

In addition to the measured salt rejection (determined by measuring the difference in conductivity between the feed and permeate), the rejection of specific cations and anions by the ECNF under all experimental conditions was monitored. When treating the no-scaling solution, rejection of both of cations (i.e., $Mg^{2+}$) and anions (i.e., $Cl^-$ and $SO_4^{2-}$) increased with increasing water recovery, although rejection of $Na^+$ fluctuated. When treating the synthetic BGW with no potentials applied, a significant drop in cation (i.e., $Ca^{2+}$, $Mg^{2+}$, and $Na^+$) and anion (i.e., $SO_4^{2-}$, and $Cl^+$) rejection was observed, while the drop of rejection was less significant when potentials were applied. Specifically, in the absence of applied potential, the rejection of $Ca^{2+}$, $Mg^{2+}$, $Na^+$, $SO_4^{2-}$, and $Cl^-$ decreased to 82.52±8.93%, 72.32±4.37%, 78.64±17.64%, 82.51±1.20%, and 72.00±0.76% of their initial rejections, respectively, at 55% water recovery. In contrast, when the AC conditions were applied, the rejection of $Ca^{2+}$, $Mg^{2+}$, $Na^+$, $SO_4^{2-}$, and $Cl^-$ were 97.30±0.18%, 95.40±4.60%, 95.41±6.03%, 96.82±4.70%, and 96.94±11.02% of their initial rejection, respectively, at 55% water recovery.

Once water recovery reached 55%, the experiment was stopped, and the membrane surface was rinsed, without removing the membrane from the module, for 15 minutes with deionized water (DIW). Following the DIW rinse, a fresh solution was introduced, and the experiment repeated (FIG. 5). Since $CaSO_4$ scale is known to be pH-insensitive, the DIW rinse was expected to dislodge loosely-attached particles and remove the CP layer, but not significantly dissolve any scale that grew as a result of heterogenous nucleation and crystal growth.[54,55] After the rinse, the ECNF tested under the applied AC conditions (with the scaling solution) completely recovered its water flux (i.e., 102.28±8.20 LMH), while the flux of the ECNF tested in the absence of the applied potential was 24% higher than its initial value (FIG. 5*a*). This increased flux corresponds to the significant drop in salt rejection, indicating that the membrane was damaged from the deposited $CaSO_4$ scale. In contrast, when the AC conditions were applied, only a modest drop was observed: the rinsed ECNF maintained 86.80±9.01% of its initial rejection, and the rejection reached 92.50±9.35% at 40% recovery with new feed solution. In the absence of applied potential, a significant drop in the rejection of cations and anions was observed. In the absence of the applied potentials, the rejection of $Ca^{2+}$, $Mg^{2+}$, $Na^+$, $SO_4^{2-}$, and $Cl^-$ decreased to 47.37±1.28%, 33.35±3.37%, 70.80±0.90%, 41.73±3.82%, and 30.14±6.24% of their initial rejections, respectively, in the first run of the experiment. However, when AC conditions were applied, the rejection of $Ca^{2+}$, $Mg^{2+}$, $Na^+$, $SO_4^{2-}$, and $Cl^-$ was 88.30±0.65%, 87.10±9.80%, 96.89±5.18%, 90.98±10.71%, and 79.30±12.46% of their initial rejection, respectively, in the first run of the experiment. The difference in the extent of salt rejection drop after the cleaning represents the reversibility of membrane performance, which also might support our speculation that membrane without potentials suffered from more severe gypsum scale formation.

Figure 6:
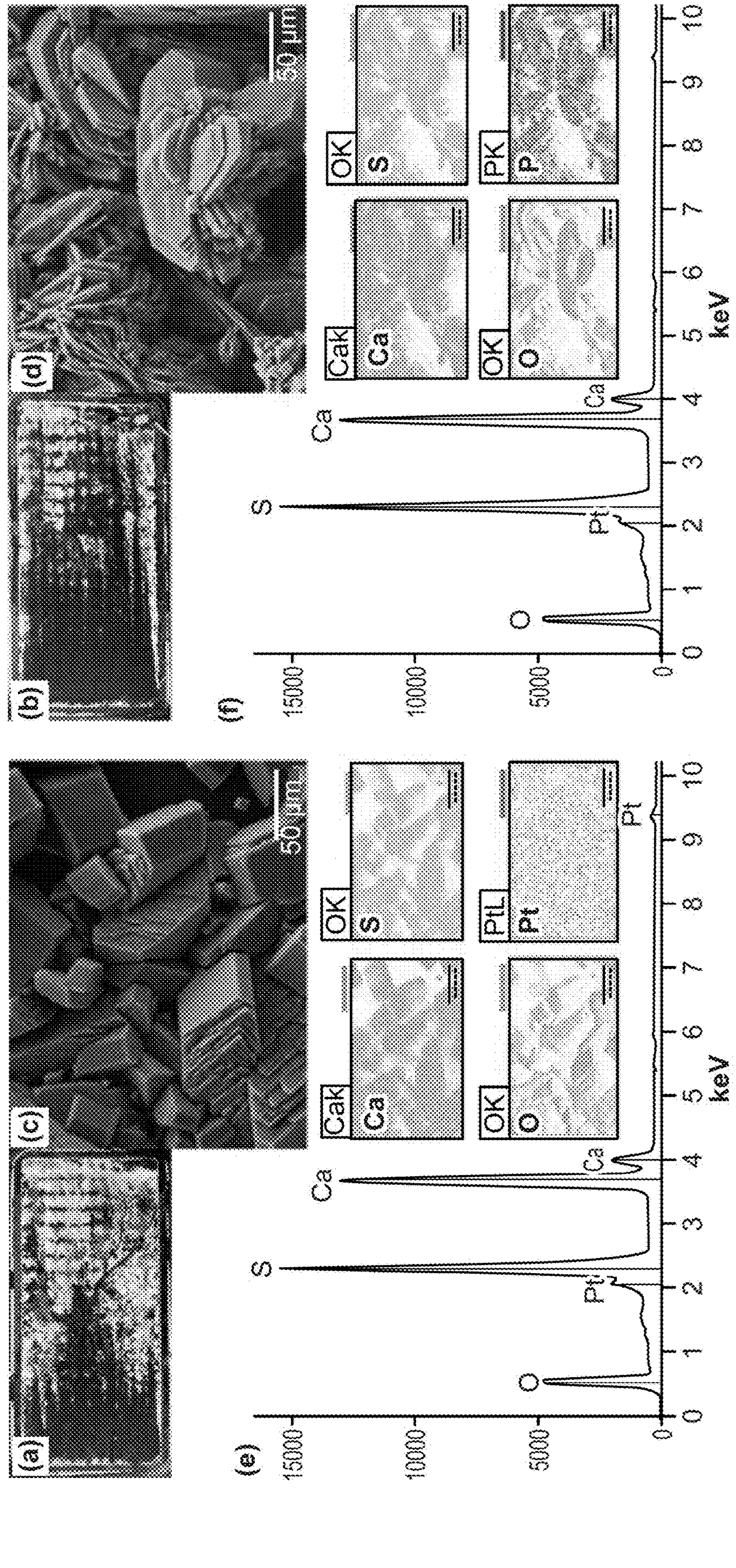
FIG. 6 illustrates surface characterization of scaled membrane that treated synthetic BGW: (a) image of scaled membrane after twice running of experiments under no potential condition; (b) SEM images of scaled membrane under no potential condition; (c) EDAX results of scaled membrane under no potential condition; (d) image of scaled membrane after twice running of experiments under 4 $V_{pp}$ condition; (e) SEM image of scaled membrane under 4 $V_{pp}$ condition; and (f) EDAX results of scaled membrane under 4 $V_{pp}$ condition, according to Example 2.

The surface of the ECNF membranes post-treatment were imaged using a digital camera, FESEM and energy-dispersive X-ray spectroscopy (EDAX). Membrane images clearly show that less scale was formed on the membrane when AC conditions were applied, compared to the no potential condition. (FIGS. 6*a* and *b*). FESEM images of the $CaSO_4$ scale did not show the distinct rosette structure typically associated with heterogeneous gypsum crystals (FIGS. 6*c* and *d*).[56,57] At low water recovery, the estimated gypsum saturation index ($SI_g$) in bulk feed was 0.96, such that no bulk precipitation is expected to occur (precipitation occurs when $SI_g>1$). However, at high water recovery (i.e., 55%), the gypsum $SI_g$ in the bulk feed increased to 2.00. Therefore, at high water recovery, not only heterogeneous nucleation contributes to gypsum crystal formation, but also bulk precipitation (i.e., homogeneous nucleation) also plays a role, resulting in the fading of distinct rosettes structure. $CaSO_4$ scale formation was confirmed using EDAX analysis, which showed that the dominant atomic species on the scaled membrane surface were Ca, S, and O (FIGS. 6*e* and *f*).

Performance of ECNF treating natural groundwater. The same experimental approach was applied towards the treatment of natural BGW extracted from an aquifer in Santa Monica, CA, with the % recovery extended to 85% to simulate a desirable treatment outcome that minimizes the volume of brine; the ionic composition of this BGW can be seen in Table 1. The initial salt rejection of the natural BGW was 69.89±1.96% and 63.42±0.90% without and with potentials, respectively; it is unclear why salt rejection decreased when the potential was applied.

Figure 7:
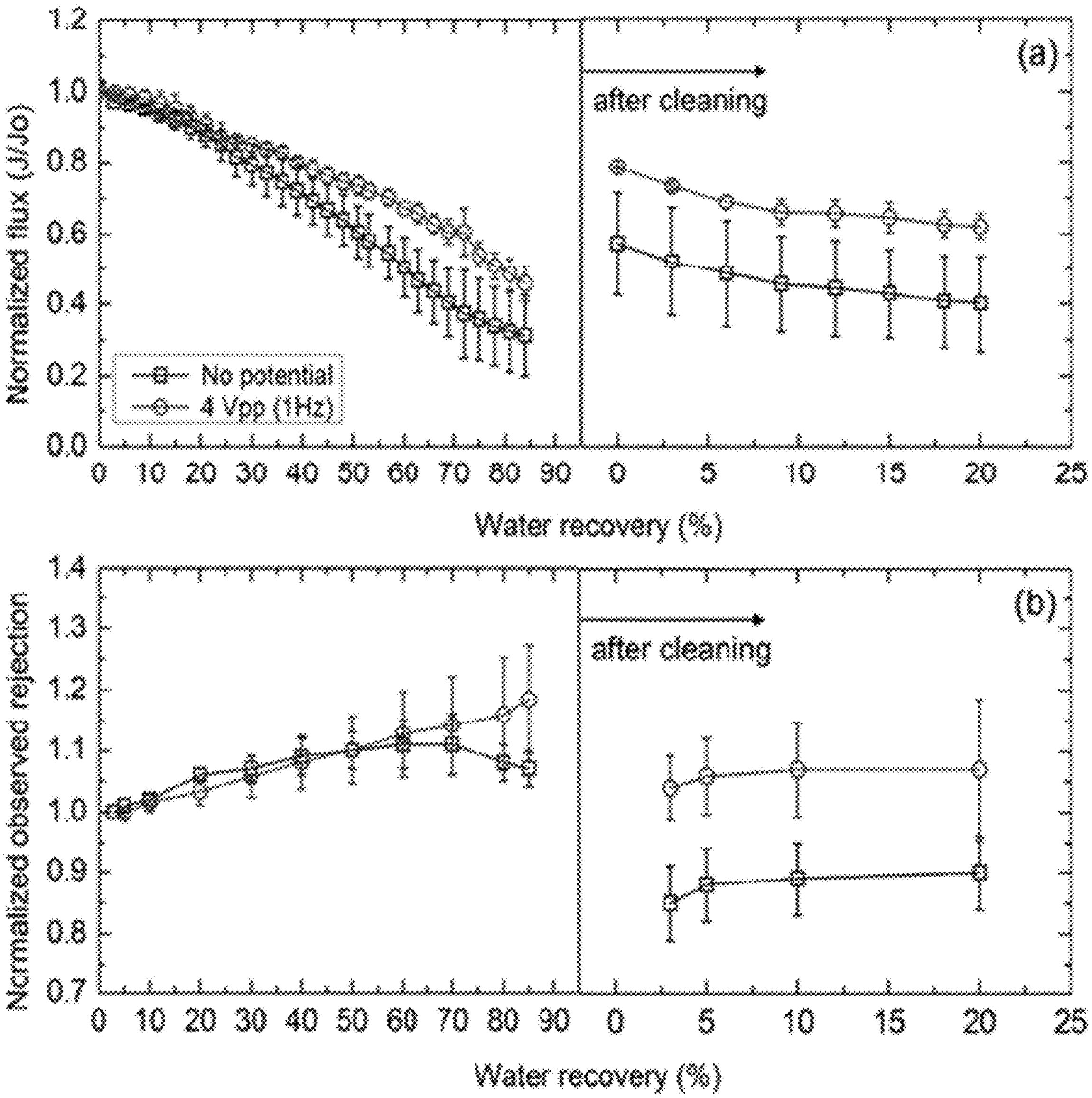
FIG. 7 illustrates the performance of ECNF treating natural BGW: (a) Normalized flux of ECNF membranes over water recovery under no potential. and 4 $V_{pp}$[(b) Normalized observed salt rejection of ECNF over water recovery under no potential, and 4 $V_{pp}$ condition, where each figure shares the legend—no potential (black square), and 4 $V_{pp}$(red circle), according to Example 2.

Changes in the water flux and salt rejection with and without the applied electrical conditions can be seen in FIGS. 7*a* and *b*. Similarly, to the results generated with synthetic BGW, water flux decreased with increasing water recovery under all experimental conditions. The flux of ECNF without potentials decreased to 31.30±11.35% (a 68.7% decline) of the initial flux at 85% recovery, while the flux of ECNF with the applied potential only decreased to 45.89±5.06% (a 54.1% decline) at the same recovery (FIG. 5*a*). For salt rejection, when AC conditions were applied, the ECNF exhibited increasing salt rejection over the course of experiment, with salt rejection increasing to 118±8.84% of the initial rejection value at 85% recovery. However, in the absence of the AC conditions, the ECNF exhibited an increasing salt rejection only up to 70% recovery (110±4.10% of the initial rejection), at which point the rejection declined (to 107±2.64% at 85%) (FIG. 2*b*). While not statistically significant, the trend suggests that the membrane may have been damaged as a result of crystal growth. Furthermore, the larger flux decline observed in the absence of AC conditions further strengthens the case that AC conditions, when applied to the surface of ECNF membranes minimize the formation of scale, even with natural BGW.

Figure 8:
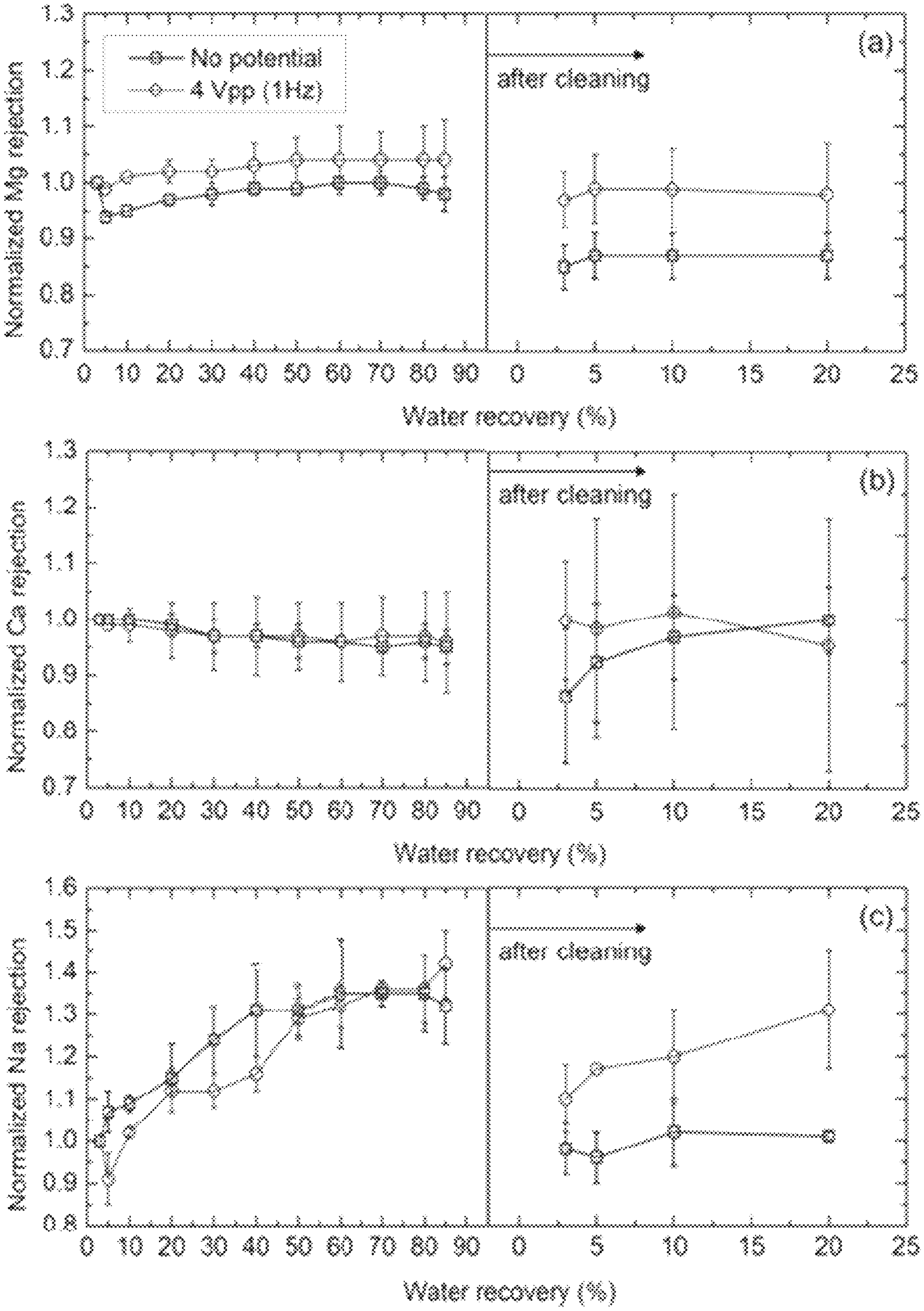
FIG. 8 illustrates the normalized cation rejections of ECNT treating natural BGW over water recovery under no potential and 4 $V_{pp}$, 1 Hz conditions: (a) normalized $Mg^{2+}$ rejection. (b) normalized $Ca^{2+}$ rejection. (c) normalized $Na^{+}$ rejection, where each figure shares the legend—no potential (black square) and 4 $V_{pp}$ (red circle), according to Example 2.
Figure 9:
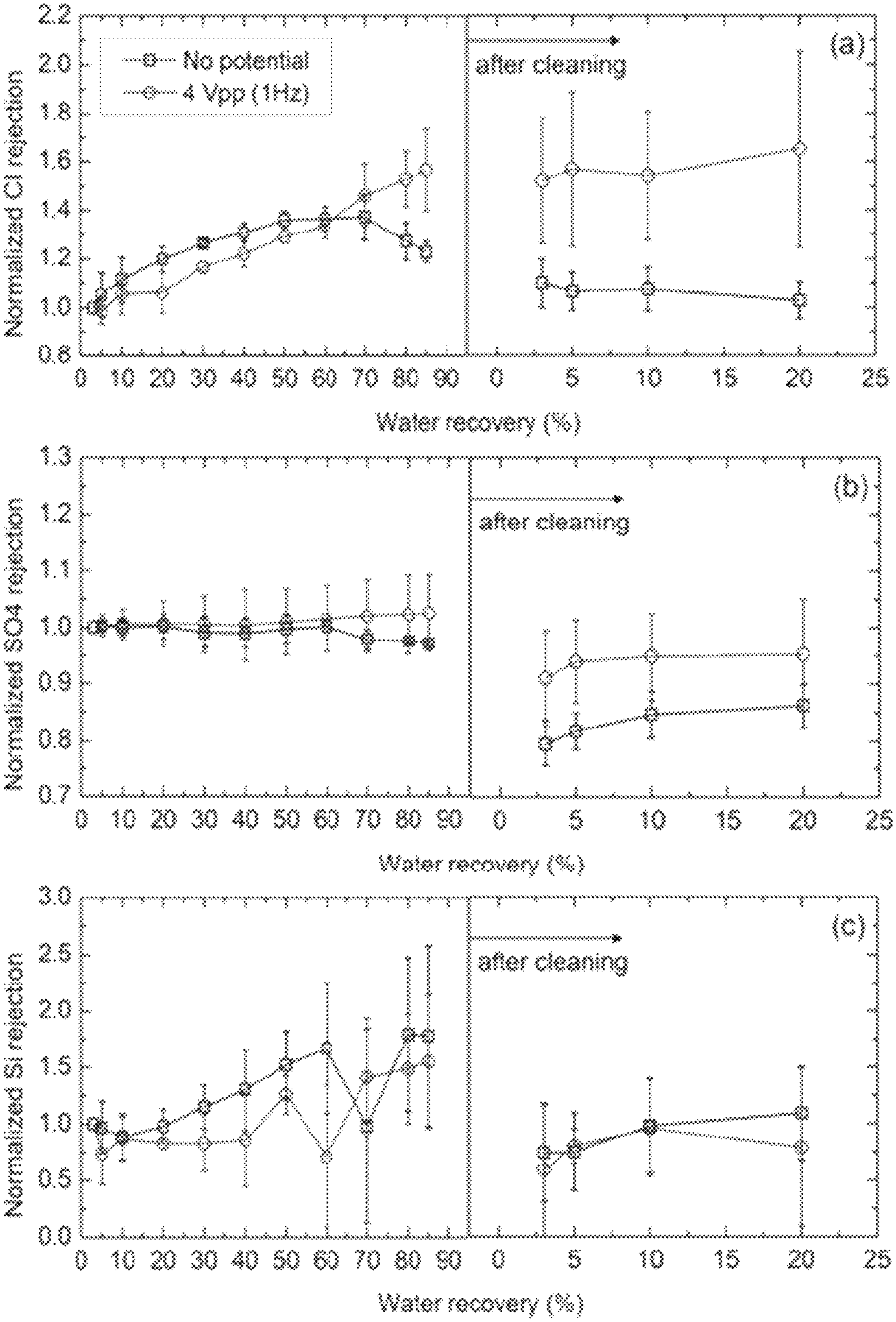
FIG. 9 illustrates normalized anion rejections of ECNT treating natural BGW over water recovery under no potential and 4 $V_{pp}$, 1 Hz conditions: (a) normalized Cl-rejection; (b) normalized $SO_4^{2-}$ rejection; and (c) normalized Si rejection, where each figure shares the legend—no potential (black square) and 4 $V_{pp}$ (red circle), according to Example 2.

The rejection of cations ($Ca^{2+}$, $Mg^{2+}$, and $Na^{+}$) and anions ($SO_4^{2-}$, $Cl^{-}$, and Si) by the ECNF was monitored throughout the experiments (FIGS. 8 and 9). In the absence of applied potentials, a notable decrease in $Na^{+}$ and $Mg^{2+}$ rejection was observed when recovery reached ~70% recovery (FIGS. 8*a* and *c*). In contrast, under the applied AC conditions, no drop in rejection was observed throughout the experiment. Under all experimental conditions, $Ca^{2+}$ rejection decreased with increasing water recovery (FIG. 8*b*). For anions, in the absence of the applied potentials, a decrease in $Cl^{-}$ and $SO_4^{2-}$ rejection at high recovery, and no change in Si rejection was observed (FIG. 9*a-c*). When AC conditions were applied, $Cl^{-}$ and $SO_4^{2-}$ rejection increased with increasing water recovery. However, Si rejection decreased at low water recovery, and began to increase at 50% recovery; although the reason is unclear, Si is expected to be uncharged (i.e., $Si(OH)_4$) in the pH range of groundwater (8-8.5), which should minimize the impact of the applied potential.

Once 85% recovery was achieved, the membranes were soaked in an HCl solution (pH 2) for 1 hour, and the performance of the cleaned membrane was tested with fresh feed. After the cleaning, the ECNF membranes without the applied AC conditions recovered to 57.12±14.32% of its initial flux while ECNF membrane with the applied AC conditions recovered to 78.56±0.08% of its initial flux (FIG. 7*a*). Unlike in the synthetic BGW case, cleaning (i.e., acid soaking) was less effective in restoring flux, which is likely due to the different composition of the scale. Natural BGW not only has a potential for gypsum scale formation, but also has a potential of calcium carbonate and silicate scale. For this complex scale, a combination of cleaning steps (e.g., acid cleaning followed by base cleaning) is conventionally employed in groundwater treatment plants.[58,59] Interestingly, the ECNF membrane without the applied AC conditions experienced a significant drop in salt rejection after the cleaning (85.19±6.20% of the initial rejection value). In contrast, the ECNF membranes with the applied AC conditions fully recovered its salt rejection (104±5.20% of its initial value). In line with the overall salt rejection, a significant decrease in anion and cation rejection after the cleaning was observed in the absence of the AC conditions (FIGS. 8 and 9).

Figure 10:
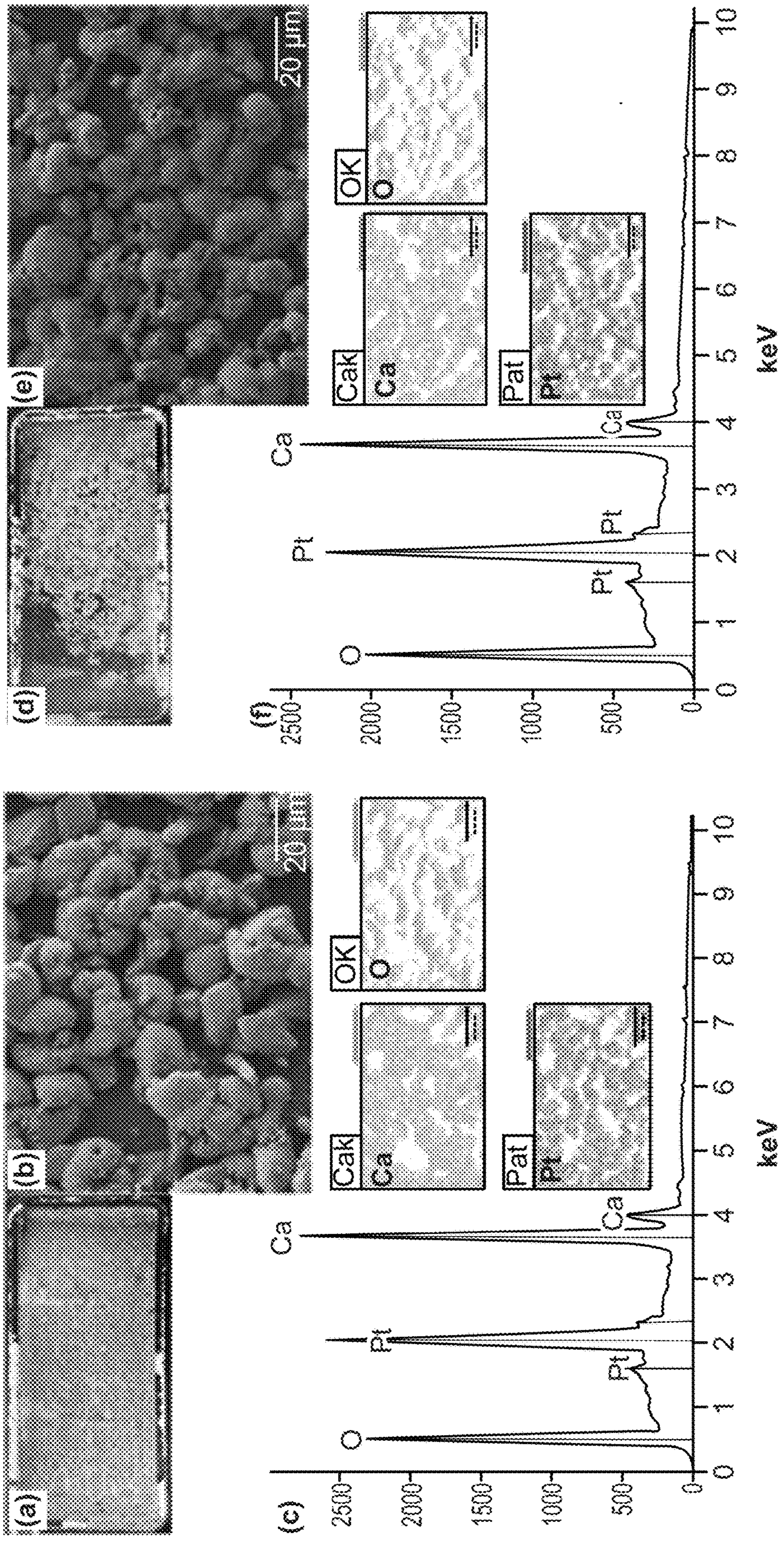
FIG. 10 illustrates surface characterization of scaled membrane that treated natural BW solution: (a) image of scaled membrane after twice running of experiments under no potential condition; (b) SEM images of scaled membrane under no potential condition; (c) EDAX results of scaled membrane under no potential condition; (d) image of scaled membrane after twice running of experiments under 4 $V_{pp}$ condition; (e) SEM image of scaled membrane under 4 $V_{pp}$ condition. (f) EDAX results of scaled membrane under 4 $V_{pp}$ condition, according to Example 2.
Figure 11:
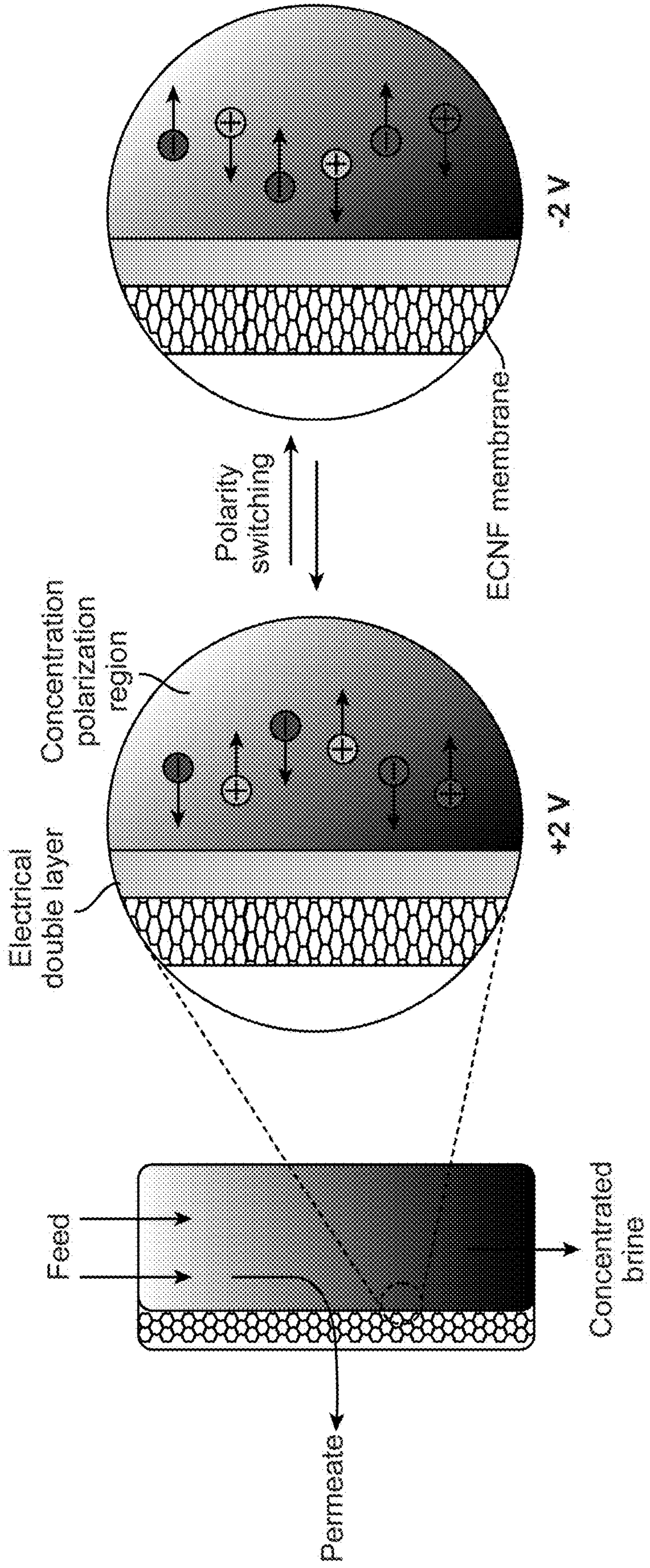
FIG. 11 is an illustration of movement of ions responding to polarity switching.
Figure 12:
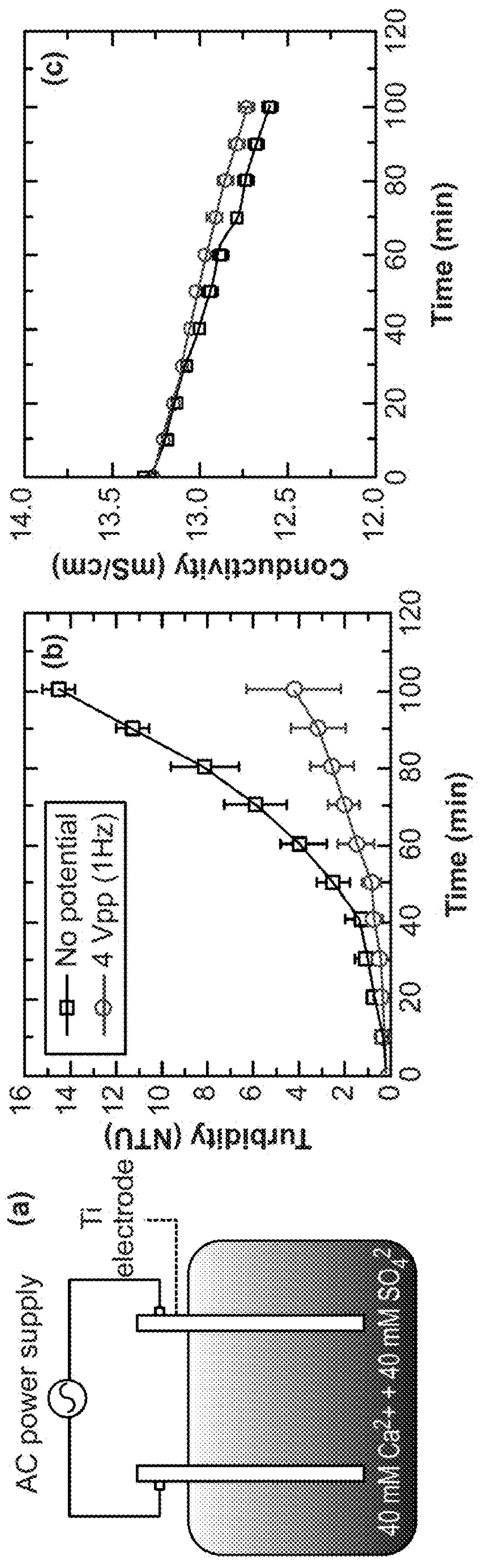
FIG. 12 is a (a) Schematic diagram of a electrolytic cell for homogeneous gypsum nucleation; (b) Turbidity evolution under no potential (black square) and 4 Vpp (red circle) conditions; and (c) Change in conductivity of bulk solution over time under no potential and 4 Vpp conditions, according to Example 2.

Once 20% water recovery was achieved (in the second round), the surface of ECNF membranes was analyzed using FESEM and EDAX. In general, less scale was observed on the surface of ECNF membrane when AC conditions were applied (FIG. 10). Specifically, scale was formed throughout the membrane surface when no potentials were applied (FIG. 10*a*), while under the AC conditions the membrane was scale-free in the entrance region (left side of membrane in FIG. 10*d*), with some scale visible at the exit region. FESEM images showed a non-specific crystal structure, likely due to its mixed nature (i.e., $CaSO_4$, $CaCO_3$, silicate, etc.) (FIGS. 10*b* and *e*). EDAX results showed that the dominant atoms in the scale were Ca and O (FIGS. 10*c* and *f*).

The less/delayed gypsum nucleation on membrane surface is likely because of the electrophoretic mixing induced by applied AC potentials (FIG. 5). During ECNF serves as a cathode (i.e., −2 V on membrane), cations (i.e., $Ca^{2+}$, $Mg^{2+}$, and $Na^{+}$) moves toward the membrane, while anions (i.e., $Cl^{-}$ and $SO_4^{2-}$) move in the opposite direction toward the counter electrode. After 0.5 s when the polarity is switched (ECNF as an anode), cations and anions alter their direction of movement corresponding to the changed polarity, providing insufficient time for nucleation.[36] Even in the case when time for nucleation is sufficient, significantly enhanced surface charge provided by an external voltage source leads to a thicker electrical double layer formation, moving the nucleation zone away from the membrane surface. Then, nuclei formed away from the membrane surface can be easily carried away by cross flow of water.[60]

Effect of AC potential on homogeneous gypsum nucleation in an electrolytic cell. To investigate the impact of AC conditions on homogeneous $CaSO_4$ nucleation, an electrolytic cell that consists of two titanium electrodes immersed in a highly saturated $CaSO_4$ solution (i.e., 40 mM of $Ca^{2+}$ and $SO_4^{2-}$) was constructed (FIG. 4*a*). The $CaSO_4$ solution ($SI_g$ of 2.27) was prefiltered by 0.22 μm filter which is known to eliminate solid impurities that could facilitate the heterogeneous nucleation process.[61] When no potential was applied, turbidity rapidly increased to 14.48±0.73 NTU, and the conductivity of the bulk solution decreased from 13.29±0.06 mS/cm to 12.60±0.04 mS/cm after 100 minutes, indicating the rapid formation of $CaSO_4$ crystals (FIGS. 9*b* and *c*). When AC conditions were applied (4 Vpp, 1 Hz), turbidity was greatly reduced (4.17±2.02 NTU) in the bulk solution, and conductivity decreased to 12.73±0.01 mS/cm. The difference in solution turbidity and conductivity implies less $CaSO_4$ nucleation and crystal growth occurred in the presence of the AC conditions. The final conductivity with potential was only slightly higher than the final conductivity with no potential, compared to the large differences in turbidity. According to light scattering theory, in a spherical monodisperse solution, the total intensity of the scattered light is proportional to the sixth power of the particle radius in the Rayleigh scattering region (i.e., when particle radius <<wavelength of light) or to the fourth power of the particle radius in the Mie scattering region (i.e., when particle radius wavelength of light).[62-64] Thus, even a small change in solution conductivity could cause significant changes in light scattering, resulting in a dramatic turbidity change.

Summary and conclusions. In this study, the effect of AC potentials (4 $V_{pp}$, 1 Hz, square form) on scale formation was investigated. An ECNF membrane filtration system treating synthetic gypsum scale solution and natural groundwater was employed to investigate membrane scaling, while an electrolytic cell was used for homogeneous nucleation. The application of AC potentials has been shown to effectively mitigated scale formation both on the surface of ECNF membranes (simultaneous homogenous and heterogeneous nucleation) and in a bulk solution in the electrolytic cell (homogeneous nucleation dominant).

With AC potentials applied, the ECNF membrane treating synthetic BGW experienced less severe flux decline, and almost no salt rejection drop over the course of treatment. In contrast, in the absence of applied potentials, a significant flux decline and large salt rejection drop was observed. In addition, after a cleaning step (i.e., DIW flushing), it was observed that membrane performance (i.e., flux and salt rejection) was deteriorated under the no potential condition due to irreversible scale formation, while the performance was nearly fully recovered with AC potentials. Similarly, when the ECNF membrane was used to natural BGW, the application of AC potentials resulted in less severe flux decline, no decrease in salt rejection, and excellent reversibility of membrane performance (flux and salt rejection) after a cleaning step. However, in the absence of the applied potentials, the membrane suffered from significant flux decline, salt rejection drop, and severe irreversibility of membrane performance after the cleaning. These findings imply that employing ECNF membranes with applied AC potentials could be a chemical-free and environmentally benign way to minimize brine production and increase the availability of potable water, by increasing water recovery during brachish groundwater desalination.

In the electrolytic cell, the impact of AC potentials on homogeneous nucleation was investigated by monitoring turbidity and conductivity of the bulk solution. With AC potentials applied, the evolution of turbidity was significantly retarded, and the decrease in conductivity was relatively small, compared to the no-potential conditions. This finding implies that the application of AC potentials is effective in the mitigation of multiple forms of scaling, including on other surfaces prone to scaling, such as heat exchangers.

REFERENCES (1) Gebauer, D.; Völkel, A.; Cölfen, H. Stable Prenucleation Calcium Carbonate Clusters. *Science* (80-). 2008, 322 (5909), 1819-1822. https://doi.org/10.1126/science.1164271.

(2) Tut Haklidir, F.; Haklidir, M. Fuzzy Control of Calcium Carbonate and Silica Scales in Geothermal Systems. *Geothermics* 2017, 70 (July), 230-238. https://doi.org/10.1016/j.geothermics.2017.07.003.

(3) Amjad, Z. Calcium Sulfate Dihydrate (Gypsum) Scale Formation on Heat Exchanger Surfaces: The Influence of Scale Inhibitors. *J. Colloid Interface Sci.* 1988, 123 (2), 523-536. https://doi.org/10.1016/0021-9797(88)90274-3.

(4) Rioyo, J.; Aravinthan, V.; Bundschuh, J.; Lynch, M. Research on 'High-PH Precipitation Treatment' for RO Concentrate Minimization and Salt Recovery in a Municipal Groundwater Desalination Facility. *Desalination* 2018, 439 (October 2017), 168-178. https://doi.org/10.1016/j.desal.2018.04.020.

(5) Rahardianto, A.; McCool, B. C.; Cohen, Y. Accelerated Desupersaturation of Reverse Osmosis Concentrate by Chemically-Enhanced Seeded Precipitation. *Desalination* 2010, 264 (3), 256-267. https://doi.org/10.1016/j.desal.2010.06.018.

(6) Rahardianto, A.; Gao, J.; Gabelich, C. J.; Williams, M. D.; Cohen, Y. High Recovery Membrane Desalting of Low-Salinity Brackish Water: Integration of Accelerated Precipitation Softening with Membrane RO. *J. Memb. Sci.* 2007, 289 (1-2), 123-137. https://doi.org/10.1016/j.memsci.2006.11.043.

(7) Elimelech, M.; Bhattacharjee, S. A Novel Approach for Modeling Concentration Polarization in Crossflow Membrane Filtration Based on the Equivalence of Osmotic Pressure Model and Filtration Theory. *J. Memb. Sci.* 1998, 145 (2), 223-241. https://doi.org/10.1016/S0376-7388(98)00078-7.

(8) Kim, S.; Hoek, E. M. V. Modeling Concentration Polarization in Reverse Osmosis Processes. *Desalination* 2005, 186 (1-3), 111-128. https://doi.org/10.1016/j.desal.2005.05.017.

(9) Kucera, J. Reverse Osmosis Membrane Fouling Control. In *The Science and Technology of Industrial Water Treatment*; Taylor & Francis: London, 2010; pp 247-270. https://doi.org/10.1201/9781420071450.

(10) Liu, Q.; Xu, G. R.; Das, R. Inorganic Scaling in Reverse Osmosis (RO) Desalination: Mechanisms, Monitoring, and Inhibition Strategies. *Desalination* 2019, 468 (June), 114065. https://doi.org/10.1016/j.desal.2019.07.005.

(11) Younos, T. Environmental Issues of Desalination. *J. Contemp. Water Res. Educ.* 2009, 132 (1), 11-18. https://doi.org/10.1111/j.1936-704x.2005.mp132001003.x.

(12) Walha, K.; Amar, R. Ben; Firdaous, L.; Quéméneur, F.; Jaouen, P. Brackish Groundwater Treatment by Nanofiltration, Reverse Osmosis and Electrodialysis in Tunisia: Performance and Cost Comparison. *Desalination* 2007, 207 (1-3), 95-106. https://doi.org/10.1016/j.desal.2006.03.583.

(13) Galanakis, C. M.; Fountoulis, G.; Gekas, V. Nanofiltration of Brackish Groundwater by Using a Polypiperazine Membrane. *Desalination* 2012, 286, 277-284. https://doi.org/10.1016/j.desal.2011.11.035.

(14) Badruzzaman, M.; Subramani, A.; DeCarolis, J.; Pearce, W.; Jacangelo, J. G. Impacts of Silica on the Sustainable Productivity of Reverse Osmosis Membranes Treating Low-Salinity Brackish Groundwater. *Desalination* 2011, 279 (1-3), 210-218. https://doi.org/10.1016/j.desal.2011.06.013.

(15) Rahardianto, A.; Mccool, B. C.; Cohen, Y. Reverse Osmosis Desalting of Inland Brackish Water of High Gypsum Scaling Propensity: Kinetics and Mitigation of Membrane Mineral Scaling. *Environ. Sci. Technol.* 2008, 42 (12), 4292-4297. https://doi.org/i0.1021/es702463a.

(16) Warsinger, D. M.; Tow, E. W.; Maswadeh, L. A.; Connors, G. B.; Swaminathan, J.; Lienhard V, J. H. Inorganic Fouling Mitigation by Salinity Cycling in Batch Reverse Osmosis. *Water Res.* 2018, 137, 384-394. https://doi.org/10.1016/j.watres.2018.01.060.

(17) Koo, T.; Lee, Y. J.; Sheikholeslami, R. Silica Fouling and Cleaning of Reverse Osmosis Membranes. *Desalination* 2001, 139 (1-3), 43-56. https://doi.org/10.1016/S0011-9164(01)00293-4.

(18) Gebauer, D.; Cölfen, H. Prenucleation Clusters and Non-Classical Nucleation. *Nano Today* 2011, 6 (6), 564-584. https://doi.org/10.1016/j.nantod.2011.10.005.

(19) Saharay, M.; Yazaydin, A. O.; Kirkpatrick, R. J. Dehydration-Induced Amorphous Phases of Calcium Carbonate. *J. Phys. Chem. B* 2013, 117 (12), 3328-3336. https://doi.org/10.1021/jp308353t.

(20) Saha, A.; Lee, J.; Pancera, S. M.; Bräeu, M. F.; Kempter, A.; Tripathi, A.; Bose, A. New Insights into the Transformation of Calcium Sulfate Hemihydrate to Gypsum Using Time-Resolved Cryogenic Transmission Electron Microscopy. *Langmuir* 2012, 28 (30), 11182-11187. https://doi.org/10.1021/1a3024474.

(21) Baoxia, M. I.; Elimelech, M. Gypsum Scaling and Cleaning in Forward Osmosis: Measurements and Mechanisms. *Environ. Sci. Technol.* 2010, 44 (6), 2022-2028. https://doi.org/10.1021/es903623r.

(22) McCool, B. C.; Rahardianto, A.; Faria, J.; Kovac, K.; Lara, D.; Cohen, Y. Feasibility of Reverse Osmosis Desalination of Brackish Agricultural Drainage Water in the San Joaquin Valley. *Desalination* 2010, 261 (3), 240-250. https://doi.org/10.1016/j.desal.2010.05.031.

(23) Bush, J. A.; Vanneste, J.; Gustafson, E. M.; Waechter, C. A.; Jassby, D.; Turchi, C. S.; Cath, T. Y. Prevention and Management of Silica Scaling in Membrane Distillation Using PH Adjustment. *J. Memb. Sci.* 2018, 554, 366-377. https://doi.org/10.1016/j.memsci.2018.02.059.

(24) Sweity, A.; Oren, Y.; Ronen, Z.; Herzberg, M. The Influence of Antiscalants on Biofouling of RO Membranes in Seawater Desalination. *Water Res.* 2013, 47 (10), 3389-3398. https://doi.org/10.1016/j.watres.2013.03.042.

(25) Vrouwenvelder, J. S.; Manolarakis, S. A.; Veenendaal, H. R.; Van Der Kooij, D. Biofouling Potential of Chemicals Used for Scale Control in RO and NF Membranes. *Desalination* 2000, 132 (1-3), 1-10. https://doi.org/10.1016/S0011-9164(00)00129-6.

(26) Li, H. Y.; Ma, W.; Wang, L.; Liu, R.; Wei, L. Sen; Wang, Q. Inhibition of Calcium and Magnesium-Containing Scale by a New Antiscalant Polymer in Laboratory Tests and a Field Trial. *Desalination* 2006, 196 (1-3), 237-247. https://doi.org/10.1016/j.desal.2005.11.024.

(27) Antony, A.; Low, J. H.; Gray, S.; Childress, A. E.; Le-Clech, P.; Leslie, G. Scale Formation and Control in High Pressure Membrane Water Treatment Systems: A Review. *J. Memb. Sci.* 2011, 383 (1-2), 1-16. https://doi.org/10.1016/j.memsci.2011.08.054.

(28) Drak, A.; Glucina, K.; Busch, M.; Hasson, D.; Laîne, J. M.; Semiat, R. Laboratory Technique for Predicting the Scaling Propensity of RO Feed Waters. *Desalination* 2000, 132 (1-3), 233-242. https://doi.org/10.1016/S0011-9164(00)00154-5.

(29) Matin, A.; Rahman, F.; Shafi, H. Z.; Zubair, S. M. Scaling of Reverse Osmosis Membranes Used in Water Desalination: Phenomena, Impact, and Control; Future Directions. *Desalination* 2019, 455 (January), 135-157. https://doi.org/10.1016/j.desal.2018.12.009.

(30) Venkatesan, A.; Wankat, P. C. Simulation of Ion Exchange Water Softening Pretreatment for Reverse Osmosis Desalination of Brackish Water. *Desalination* 2011, 271 (1-3), 122-131. https://doi.org/10.1016/j.desal.2010.12.022.

(31) Comstock, S. E. H.; Boyer, T. H.; Graf, K. C. Treatment of Nanofiltration and Reverse Osmosis Concentrates: Comparison of Precipitative Softening, Coagulation, and Anion Exchange. *Water Res.* 2011, 45 (16), 4855-4865. https://doi.org/10.1016/j.watres.2011.06.035.

(32) Gu, H.; Bartman, A. R.; Uchymiak, M.; Christofides, P. D.; Cohen, Y. Self-Adaptive Feed Flow Reversal Operation of Reverse Osmosis Desalination. *Desalination* 2013, 308, 63-72. https://doi.org/10.1016/j.desal.2012.07.041.

(33) Uchymiak, M.; Bartman, A. R.; Daltrophe, N.; Weissman, M.; Gilron, J.; Christofides, P. D.; Kaiser, W. J.; Cohen, Y. Brackish Water Reverse Osmosis (BWRO) Operation in Feed Flow Reversal Mode Using an Ex Situ Scale Observation Detector (EXSOD). *J. Memb. Sci.* 2009, 341 (1-2), 60-66. https://doi.org/10.1016/j.memsci.2009.05.039.

(34) Bartman, A. R.; McFall, C. W.; Christofides, P. D.; Cohen, Y. Model-Predictive Control of Feed Flow Reversal in a Reverse Osmosis Desalination Process. *J. Process Control* 2009, 19 (3), 433-442. https://doi.org/10.1016/j.jprocont.2008.06.016.

(35) Duan, W.; Dudchenko, A.; Mende, E.; Flyer, C.; Zhu, X.; Jassby, D. Electrochemical Mineral Scale Prevention and Removal on Electrically Conducting Carbon Nanotube—Polyamide Reverse Osmosis Membranes. *Environ. Sci. Process. Impacts* 2014, 16 (6), 1300. https://doi.org/10.1039/c3em00635b.

(36) Rao, U.; Iddya, A.; Jung, B.; Khor, C. M.; Hendren, Z.; Turchi, C.; Cath, T.; Hoek, E. M. V.; Ramon, G. Z.; Jassby, D. Mineral Scale Prevention on Electrically Conducting Membrane Distillation Membranes Using Induced Electrophoretic Mixing. *Environ. Sci. Technol.* 2020, 54 (6), 3678-3690. https://doi.org/10.1021/acs.est.9b07806.

(37) Xu, X.; Zhang, H.; Yu, M.; Wang, Y.; Gao, T.; Yang, F. Conductive Thin Film Nanocomposite Forward Osmosis Membrane (TFN-FO) Blended with Carbon Nanoparticles for Membrane Fouling Control. *Sci. Total Environ.* 2019, 697, 134050. https://doi.org/10.1016/j.scitotenv.2019.134050.

(38) Ahmed, F.; Lalia, B. S.; Kochkodan, V.; Hilal, N.; Hashaikeh, R. Electrically Conductive Polymeric Membranes for Fouling Prevention and Detection: A Review. *Desalination* 2016, 391, 1-15. https://doi.org/10.1016/j.desal.2016.01.030.

(39) Hasson, D.; Lumelsky, V.; Greenberg, G.; Pinhas, Y.; Semiat, R. Development of the Electrochemical Scale Removal Technique for *Desalination* Applications. *Desalination* 2008, 230 (1-3), 329-342. https://doi.org/10.1016/j.desal.2008.01.004.

(40) Tijing, L. D.; Lee, D. H.; Kim, D. W.; Cho, Y. I.; Kim, C. S. Effect of High-Frequency Electric Fields on Calcium Carbonate Scaling. *Desalination* 2011, 279 (1-3), 47-53. https://doi.org/10.1016/j.desal.2011.05.072.

(41) Abd-El-Khalek, D. E.; Abd-El-Nabey, B. A. Evaluation of Sodium Hexametaphosphate as Scale and Corrosion Inhibitor in Cooling Water Using Electrochemical Techniques. *Desalination* 2013, 311, 227-233. https://doi.org/10.1016/j.desal.2012.11.017.

(42) Zhu, X.; Jassby, D. Electroactive Membranes for Water Treatment: Enhanced Treatment Functionalities, Energy Considerations, and Future Challenges. *Acc. Chem. Res.* 2019, 52, 1177-1186. https://doi.org/10.1021/acs.accounts.8b00558.

(43) Duan, W.; Ronen, A.; de Leon, J. V.; Dudchenko, A.; Yao, S.; Corbala-Delgado, J.; Yan, A.; Matsumoto, M.; Jassby, D. Treating Anaerobic Sequencing Batch Reactor Effluent with Electrically Conducting Ultrafiltration and Nanofiltration Membranes for Fouling Control. *J. Memb. Sci.* 2016, 504, 104-112. https://doi.org/10.1016/j.memsci.2016.01.011.

(44) Karabelas, A. J.; Mitrouli, S. T.; Kostoglou, M. Scaling in Reverse Osmosis Desalination Plants: A Perspective Focusing on Development of Comprehensive Simulation Tools. *Desalination* 2020, 474 (November 2019), 114193. https://doi.org/10.1016/j.desal.2019.114193.

(45) Turek, M.; Mitko, K.; Piotrowski, K.; Dydo, P.; Laskowska, E.; Jakóbik-Kolon, A. Prospects for High Water Recovery Membrane *Desalination. Desalination* 2017, 401, 180-189. https://doi.org/10.1016/j.desal.2016.07.047.

(46) Verissimo, S.; Peinemann, K. V.; Bordado, J. Influence of the Diamine Structure on the Nanofiltration Performance, Surface Morphology and Surface Charge of the Composite Polyamide Membranes. *J. Memb. Sci.* 2006, 279 (1-2), 266-275. https://doi.org/10.1016/j.memsci.2005.12.014.

(47) Tian, J.; Chang, H.; Gao, S.; Zhang, R. How to Fabricate a Negatively Charged NF Membrane for Heavy Metal Removal via the Interfacial Polymerization between PIP and TMC? *Desalination* 2020, 491 (March), 114499. https://doi.org/10.1016/j.desal.2020.114499.

(48) Peng, H.; Tang, Q.; Tang, S.; Gong, J.; Zhao, Q. Surface Modified Polyamide Nanofiltration Membranes with High Permeability and Stability. *J. Memb. Sci.* 2019, 592 (August). https://doi.org/10.1016/j.memsci.2019.117386.

(49) Phuntsho, S.; Lotfi, F.; Hong, S.; Shaffer, D. L.; Elimelech, M.; Shon, H. K. Membrane Scaling and Flux Decline during Fertiliser-Drawn Forward Osmosis Desalination of Brackish Groundwater. *Water Res.* 2014, 57, 172-182. https://doi.org/10.1016/j.watres.2014.03.034.

(50) Zhang, W.; Luo, J.; Ding, L.; Jaffrin, M. Y. A Review on Flux Decline Control Strategies in Pressure-Driven Membrane Processes. *Ind. Eng. Chem. Res.* 2015, 54 (11), 2843-2861. https://doi.org/10.1021/ie504848m.

(51) Fei, J.; Mai, W.; Cheng, P. S.; Shi, J.; Liu, Z.; She, Q. Membrane Structure-Dependent Limiting Flux Behavior and Membrane Selectivity Loss during Gypsum Scaling: Implications for Pressure-Retarded Osmosis Operation and Membrane Design. *Desalination* 2020, 492 (August), 114644. https://doi.org/10.1016/j.desal.2020.114644.

(52) Lin, N. H.; Shih, W. Y.; Lyster, E.; Cohen, Y. Crystallization of Calcium Sulfate on Polymeric Surfaces. *J. Colloid Interface Sci.* 2011, 356 (2), 790-797. https://doi.org/10.1016/j.jcis.2011.01.042.

(53) Jawor, A.; Hoek, E. M. V. Effects of Feed Water Temperature on Inorganic Fouling of Brackish Water RO Membranes. *Desalination* 2009, 235 (1-3), 44-57. https://doi.org/10.1016/j.desal.2008.07.004.

(54) Shih, W. Y.; Rahardianto, A.; Lee, R. W.; Cohen, Y. Morphometric Characterization of Calcium Sulfate Dihydrate (Gypsum) Scale on Reverse Osmosis Membranes. *J. Memb. Sci.* 2005, 252 (1-2), 253-263. https://doi.org/10.1016/j.memsci.2004.12.023.

(55) Rahardianto, A.; Shih, W. Y.; Lee, R. W.; Cohen, Y. Diagnostic Characterization of Gypsum Scale Formation and Control in RO Membrane *Desalination* of Brackish Water. *J. Memb. Sci.* 2006, 279 (1-2), 655-668. https://doi.org/10.1016/j.memsci.2005.12.059.

(56) Cao, B.; Ansari, A.; Yi, X.; Rodrigues, D. F.; Hu, Y. Gypsum Scale Formation on Graphene Oxide Modified Reverse Osmosis Membrane. *J. Memb. Sci.* 2018, 552 (January), 132-143. https://doi.org/10.1016/j.memsci.2018.02.005.

(57) Benecke, J.; Haas, M.; Baur, F.; Ernst, M. Investigating the Development and Reproducibility of Heterogeneous Gypsum Scaling on Reverse Osmosis Membranes Using Real-Time Membrane Surface Imaging. *Desalination* 2018, 428 (November 2017), 161-171. https://doi.org/10.1016/j.desal.2017.11.025.

(58) Porcelli, N.; Judd, S. Chemical Cleaning of Potable Water Membranes: A Review. *Sep. Purif Technol.* 2010, 71 (2), 137-143. https://doi.org/10.1016/j.seppur.2009.12.007.

(59) Woo, Y. C.; Lee, J. J.; Oh, J. S.; Jang, H. J.; Kim, H. S. Effect of Chemical Cleaning Conditions on the Flux Recovery of Fouled Membrane. *Desalin. Water Treat.* 2013, 51 (25-27), 5268-5274. https://doi.org/10.1080/19443994.2013.768754.

(60) Duan, W.; Dudchenko, A.; Mende, E.; Flyer, C.; Zhu, X.; Jassby, D. Electrochemical Mineral Scale Prevention and Removal on Electrically Conducting Carbon Nanotube-Polyamide Reverse Osmosis Membranes. *Environ. Sci. Process. Impacts* 2014, 16 (6), 1300-1308. https://doi.org/10.1039/c3em00635b.

(61) Oshchepkov, M.; Popov, K.; Kovalenko, A.; Redchuk, A.; Dikareva, J.; Pochitalkina, I. Initial Stages of Gypsum Nucleation: The Role of "Nano/Microdust." *Minerals* 2020, 10 (12), 1-13. https://doi.org/10.3390/min10121083.

(62) Siebert, K. J.; Siebert, K. J.; Science, F. The Science of Beer Relationship of Particle Size to Light Scattering Relationship of Particle Size to Light Scattering. 2018, 0470.

(63) Moosmüller, H.; Sorensen, C. M. Small and Large Particle Limits of Single Scattering Albedo for Homogeneous, Spherical Particles. *J. Quant. Spectrosc. Radiat. Transf.* 2018, 204, 250-255. https://doi.org/10.1016/j.jgsrt.2017.09.029.

(64) Moosmüller, H.; Arnott, W. P. Particle Optics in the Rayleigh Regime. *J. Air Waste Manag. Assoc.* 2009, 59 (9), 1028-1031. https://doi.org/10.3155/1047-3289.59.9.1028.

(65) Waly, T. K. A. *Minimizing the Use of Chemicals to Control Scaling in SWRO*; CRC Press, 2011.

(66) Jung, B.; Kim, C. Y.; Jiao, S.; Rao, U.; Dudchenko, A. V.; Tester, J.; Jassby, D. Enhancing Boron Rejection on Electrically Conducting Reverse Osmosis Membranes through Local Electrochemical PH Modification. *Desalination* 2020, 476 (September 2019). https://doi.org/10.1016/j.desal.2019.114212.

As used herein, the terms "connect," "connected," and "connection" refer to an operational coupling or linking. Connected objects may be directly coupled to one another or may be indirectly coupled to one another, such as via one or more other objects.

In the description of some embodiments, a component provided or disposed "on" or "over" another component can encompass cases where the former component is directly on (e.g., in physical or direct contact with) the latter component, as well as cases where one or more intervening components are located between the former component and the latter component.

As used herein, the term "nanometer range" or "nm range" refers to a range of dimensions from about 1 nm to about 1 m. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 km.

As used herein, the term "micrometer range" or "m range" refers to a range of dimensions from about 1 m to about 1 mm. The m range includes the "lower m range," which refers to a range of dimensions from about 1 m to about 10 m, the "middle m range," which refers to a range of dimensions from about 10 m to about 100 m, and the "upper m range," which refers to a range of dimensions from about 100 m to about 1 mm.

As used herein, the term "nanostructure" refers to an object that has at least one dimension in the nm range. A nanostructure can have any of a wide variety of shapes, and may be formed of a wide variety of materials. Examples of nanostructures include nanowires, nanotubes, and nanoparticles.

As used herein, the term "nanowire" refers to an elongated nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the m range, and an aspect ratio that is about 5 or greater.

As used herein, the term "nanotube" refers to an elongated, hollow nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the m range, and an aspect ratio that is about 5 or greater.

As used herein, the term "nanoparticle" refers to a spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit, and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A membrane desalination system comprising:

a housing;

an electrically conductive membrane disposed within the housing, the electrically conductive membrane comprising:

a porous support comprising a polysulfone; and a layer of electrically conductive nanostructures comprising carbon nanotubes disposed on the porous support; and an alternating current power source connected to the electrically conductive membrane;

wherein:

the carbon nanotubes are crosslinked with a polyamide; and the layer of electrically conductive nanostructures exhibits a conductivity from about 3400 S/m to about 4000 S/m.

2. The membrane desalination system of claim 1, wherein the nanostructures form a percolating network.

3. The membrane desalination system of claim 1, wherein the porous support is a filtration membrane.

4. The membrane desalination system of claim 1, wherein a thickness of the layer is about 100 nm or greater.

5. The membrane desalination system of claim 1, wherein a thickness of the layer is about 10 nm to about 10 μm.

6. The membrane desalination system of claim 1, wherein an electrical conductivity of the layer is about 500 S/m or greater.

7. A method of imparting a membrane surface with resistance against mineral scaling, the method comprising:

providing an electrically conductive layer on a surface of the membrane, wherein the electrically conductive layer comprises nanostructures comprising carbon nanotubes; and the membrane comprises a porous support comprising a polysulfone; and applying an alternating current power source to the electrically conductive membrane;

wherein:

the carbon nanotubes are crosslinked with a polyamide; and the layer of electrically conductive nanostructures exhibits a conductivity from about 3400 S/m to about 4000 S/m.

8. The method of claim 7, wherein the nanostructures form a percolating network.

9. The method of claim 7, wherein the membrane is a filtration membrane.

10. The method of claim 7, wherein a peak voltage of the alternating current power source is at least about 0.1 V.

11. The method of claim 7, wherein a peak voltage of the alternating current power source is about 0.1 V to about 100 V.

12. The method of claim 7, wherein a frequency of the alternating current power source is at least about 0.1 Hz.

13. The method of claim 7, wherein a frequency of the alternating current power source is about 0.1 Hz to about 10,000 Hz.

* * * * *